(12) United States Patent  (10) Patent No.: US 7,709,065 B2
Yanai  (45) Date of Patent: May 4, 2010

(54) LIQUID CRYSTAL COMPOSITION AND LIQUID CRYSTAL DISPLAY DEVICE

(75) Inventor: Motoki Yanai, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 281 days.

(21) Appl. No.: 11/889,192

(22) Filed: Aug. 9, 2007

(65) Prior Publication Data

US 2008/0035886 A1 Feb. 14, 2008

(30) Foreign Application Priority Data

Aug. 10, 2006 (JP) .............................. 2006-218213

(51) Int. Cl.
*C09K 19/34* (2006.01)
*C09K 19/30* (2006.01)
*C09K 19/12* (2006.01)
*C09K 19/14* (2006.01)
*G02F 1/13* (2006.01)

(52) U.S. Cl. ............... 428/1.1; 252/299.61; 252/299.63; 252/299.66

(58) Field of Classification Search .................. 428/1.1; 252/299.61, 299.63, 299.66
See application file for complete search history.

(56) References Cited

U.S. PATENT DOCUMENTS

| 5,599,480 | A | 2/1997 | Tarumi et al. | 252/299.63 |
| 5,965,060 | A | 10/1999 | Tarumi et al. | 252/299.63 |
| 6,066,268 | A | 5/2000 | Ichinose et al. | 252/299.63 |
| 6,395,353 | B2 * | 5/2002 | Yanai et al. | 428/1.1 |
| 6,558,758 | B1 * | 5/2003 | Yanai et al. | 428/1.1 |
| 2002/0014613 | A1 | 2/2002 | Klasen et al. | 252/299.63 |
| 2006/0071194 | A1 | 4/2006 | Masukawa et al. | 252/299.61 |

FOREIGN PATENT DOCUMENTS

| JP | 08-104869 A | 4/1996 |
| JP | 10-176167 | 6/1998 |
| JP | 11-140447 | 5/1999 |
| JP | 2001-354967 | 12/2001 |
| WO | WO 2006-038522 A1 | 4/2006 |

* cited by examiner

*Primary Examiner*—Shean C Wu
(74) *Attorney, Agent, or Firm*—Hogan & Hartson LLP

(57) ABSTRACT

A liquid crystal composition having a negative dielectric anisotropy that includes three components, wherein the first component is at least one compound selected from the group of compounds represented by Formulas (1-1) to (1-6), the second component is at least one compound selected from the group of compounds represented by Formula (2), and the third component is at least one compound selected from the group of compounds represented by Formulas (3-1) and (3-2):

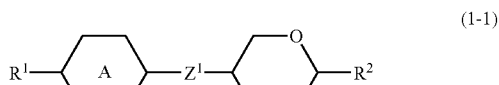

(1-1)

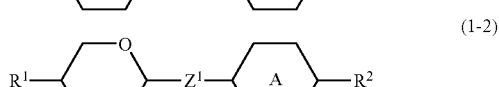

(1-2)

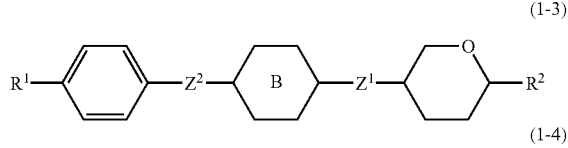

(1-3)

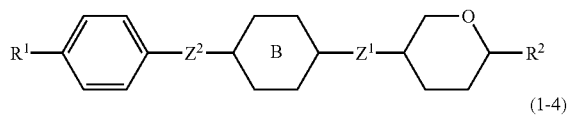

(1-4)

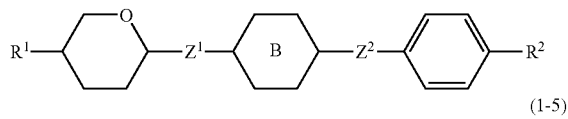

(1-5)

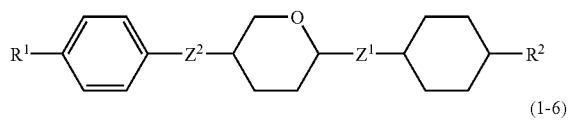

(1-6)

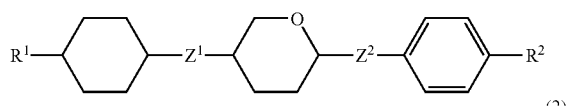

(2)

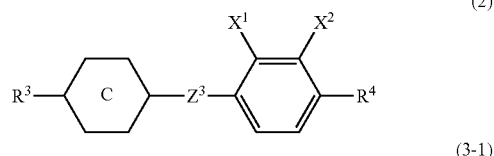

(3-1)

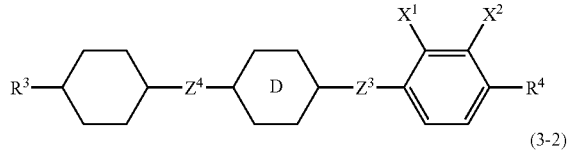

(3-2)

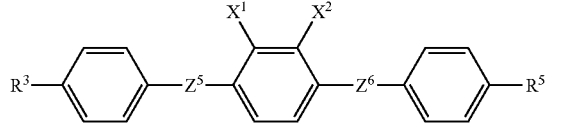

wherein, for example, $R^1$, $R^2$, $R^3$, $R^4$ and $R^5$ are alkyl having 1 to 12 carbons; $X^1$ and $X^2$ are fluorine; $Z^1$, $Z^2$, $Z^3$, $Z^4$, $Z^5$ and $Z^6$ are a single bond; and ring A, ring B, ring C and ring D are 1,4-cyclohexylene or 1,4-phenylene.

19 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2006-218213, filed Aug. 10, 2006, which is expressly incorporated herein by reference in its entirety.

BACKGROUND OF THE INVENTION

1. Field of the Invention

The invention relates to a liquid crystal composition suitable for use in an active matrix (AM) device, and an AM device containing the composition. In particular, the invention relates to a liquid crystal composition having a negative dielectric anisotropy, and to a device having an IPS (in-plane switching) mode or a VA (vertical alignment) mode containing the composition.

2. Related Art

In a liquid crystal display device, classification based on an operating mode of liquid crystals includes phase change (PC), twisted nematic (TN), super twisted nematic (STN), electrically controlled birefiingence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (IM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and an AM Device

| No | General Characteristics of a Composition | General Characteristics of an AM Device |
| --- | --- | --- |
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is large | Threshold voltage is low, electric power consumption is small, and a contrast ratio is large |
| 5 | Specific resistance is large | Voltage holding ratio is large and a contrast ratio is large |
| 6 | It is stable to ultraviolet light and heat | Service life is long |

[1]A liquid crystal composition can be injected into a cell in a short time.

The optical anisotropy of the composition relates to the contrast ratio of the device. Devices having a VA mode, an IPS mode, and so forth utilize electrically controlled birefringence. In order to maximize the contrast ratio of a device having a VA mode, an IPS mode, and so forth, a product (Δn·d) of the optical anisotropy (Δn) of the composition and the cell gap (d) of the device is designed to be a constant value. Examples of the value include from approximately 0.30 to approximately 0.40 μm (VA mode) and from approximately 0.20 to approximately 0.30 μm (IPS mode). Since the celi gap (d) is generally from approximately 2 to approximately 6 μm, the optical anisotropy of the composition is generally from approximately 0.05 to approximately 0.16. A large dielectric anisotropy of the composition contributes to a low threshold voltage, a small electric power consumption and a large contrast ratio of the device. Accordingly, a low threshold voltage is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance at room temperature and also at a high temperature after it has been used for a long time. The stability to an ultraviolet ray and heat of the composition relates to the service life of the device. The service life of the device is long when the stability is high. These characteristics are preferred for an AM device used for a liquid crystal projector, a liquid crystal television and so forth.

A composition having a positive dielectric anisotropy is used in an AM device having a TN mode. A composition having a negative dielectric anisotropy is used in an AM device having a VA mode. A composition having a positive or negative dielectric anisotropy is used in an AM device having an IPS mode. Examples of a liquid crystal composition having a negative dielectric anisotropy are disclosed in the following patent documents: JP H8-104869 A/1996, JP H10-176167 A/1998, JP H11-140447 A/1999, JP 2001-354967 A/2001 and WO 2006-038522 A/2006.

A desirable AM device is characterized as having a usable temperature range that is wide, a response time that is short, a contrast ratio that is large, a threshold voltage that is low, a voltage holding ratio that is large, a service life that is long, and so forth. Even a one millisecond shorter response time is desirable. Thus, the composition having characteristics such as a high maximum temperature of a nematic phase, a low minimum temperature of a nematic phase, a small viscosity, a large optical anisotropy, a negatively large dielectric anisotropy, a large specific resistance, a high stability to an ultraviolet light, a high stability to heat, and so forth is especially desirable.

SUMMARY OF THE INVENTION

The invention relates to a liquid crystal composition having a negative dielectric anisotropy that includes three components, wherein the first component is at least one compound selected from the group of compounds represented by Formulas (1-1) to (1-6), the second component is at least one compound selected from the group of compounds represented by Formula (2), and the third component is at least one compound selected from the group of compounds represented by Formulas (3-1) and (3-2):

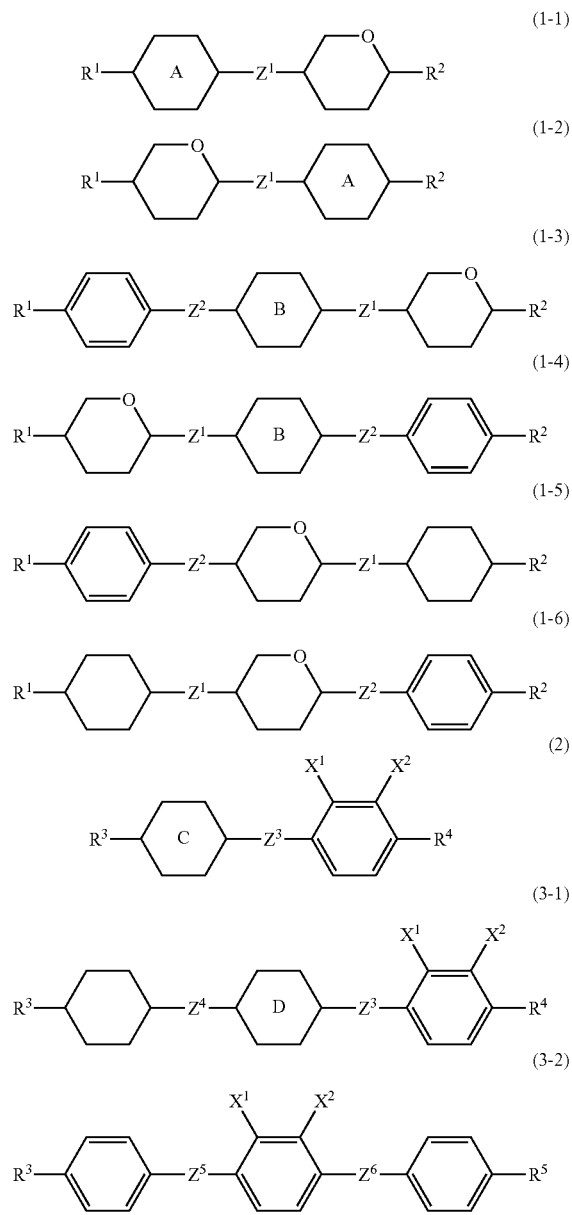

wherein $R^1$ and $R^2$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $X^1$ and $X^2$ are each independently fluorine or chlorine, provided that at least one of $X^1$ and $X^2$ is fluorine; $Z^1$ and $Z^2$ are each independently a single bond, —$CH_2CH_2$— or —CH=CH—; $Z^3$ to $Z^6$ are each independently a single bond or —$CH_2CH_2$—; and ring A, ring B, ring C and ring D are each independently 1,4-cyclohexylene or 1,4-phenylene.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a rod-like molecular structure. An optically active compound may occasionally be added to the composition. Even in the case where the compound is a liquid crystal compound, the compound is classified into an additive. At least one compound selected from a group of compounds represented by Formula (1-1) may be abbreviated to "the compound (1-1)." The term "the compound (1-1)" means one compound or two or more compounds represented by Formula (1-1). The other formulas are applied with the same rules. The term "arbitrary" means not only an arbitrary position but also an arbitrary number, and the case where the number is zero is not included.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics, such as optical anisotropy, the characteristics of the composition such as the optical anisotropy and so forth are values measured in the methods disclosed in Examples. The first component is one compound or two or more compounds. "A ratio of the first component" means the percentage by weight (% by weight) based on the total weight of liquid crystal composition. A ratio of the second component and so forth are applied with the same rule. A ratio of an additive mixed with the composition means the percentage by weight (% by weight) based on the total weight of liquid crystal composition.

The symbol $R^1$ is used for many compounds in the chemical formulas for the component compounds. $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. This rule is also applicable to the symbols $R^2$, $R^3$, $R^4$, $R^5$, $R^6$, $R^7$, $R^8$, $R^9$, $R^{10}$, $R^{11}$ and so forth.

One of the advantages of the invention is to provide a liquid crystal composition that satisfies many characteristics among the characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light, a high stability to heat and so forth, and particularly, a liquid crystal composition excellent in three characteristics including a high maximum temperature of a nematic phase, a low minimum temperature of a nematic phase and a negatively large dielectric anisotropy. Another of the advantages of the invention is to provide a liquid crystal composition that is properly balanced regarding at least two characteristics among the many characteristics. Another of the advantages of the invention is to provide a liquid crystal display device that contains the liquid crystal composition. One aspect of the invention is to provide a liquid crystal composition that has a high maximum temperature of a nematic phase, a low minimum temperature of a nematic phase, a suitable optical anisotropy, a negatively large dielectric anisotropy, a small viscosity and so forth, and is to provide an AM device that has a wide operation temperature range, a large contrast ratio, a low threshold voltage, a short response time, a large voltage holding ratio, a long service life and so forth.

The Invention Includes:

1. A liquid crystal composition having a negative dielectric anisotropy including three components, wherein the first component is at least one compound selected from the group of compounds represented by Formulas (1-1) to (1-6), the second component is at least one compound selected from the group of compounds represented by Formula (2), and the third component is at least one compound selected from the group of compounds represented by Formulas (3-1) and (3-2):

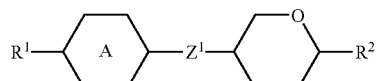
(1-1)

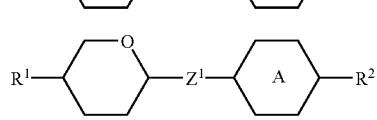
(1-2)

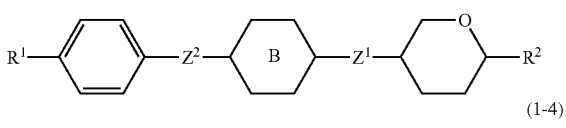
(1-3)

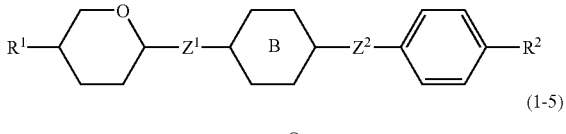
(1-4)

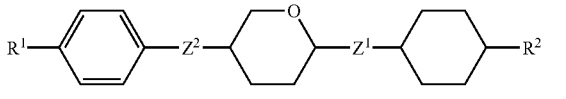
(1-5)

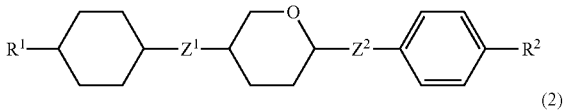
(1-6)

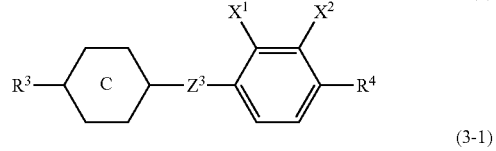
(2)

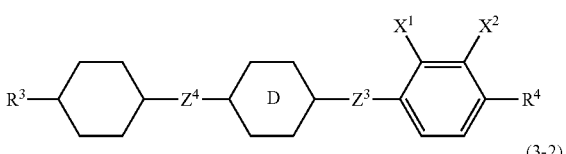
(3-1)

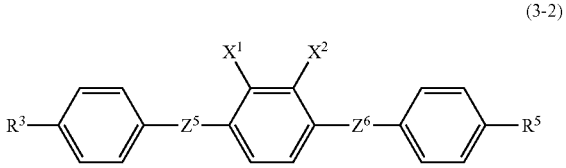
(3-2)

wherein $R^1$ and $R^2$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $X^1$ and $X^2$ are each independently fluorine or chlorine, provided that at least one of $X^1$ and $X^2$ is fluorine; $Z^1$ and $Z^2$ are each independently a single bond, —CH$_2$CH$_2$— or —CH=CH—; $Z^3$ to $Z^6$ are each independently a single bond or —CH$_2$CH$_2$—; and ring A, ring B, ring C and ring D are each independently 1,4-cyclohexylene or 1,4-phenylene.

2. The liquid crystal composition according to item 1, wherein the first component is at least one compound selected from the group of compounds represented by Formulas (1-1) and (1-2), and the third component is at least one compound selected from the group of compounds represented by Formula (3-1).

3. The liquid crystal composition according to item 1, wherein the first component is at least one compound selected from the group of compounds represented by Formulas (1-3) to (1-6), and the third component is at least one compound selected from the group of compounds represented by Formula (3-1).

4. The liquid crystal composition according to any one of items 1 to 3, wherein the ratio of the first component is from approximately 10% by weight to approximately 40% by weight, the ratio of the second component is from approximately 15% by weight to approximately 40% by weight, and the ratio of the third component is from approximately 20% by weight to approximately 50% by weight, based on the total weight of the liquid crystal composition.

5. A liquid crystal composition having a negative dielectric anisotropy including three components, wherein the first component is at least one compound selected from the group of compounds represented by Formulas (1-1-A) to (1-6-A), the second component is at least one compound selected from the group of compounds represented by Formula (2-A), and the third component is at least one compound selected from the group of compounds represented by Formulas (3-1-A) and (3-2-A):

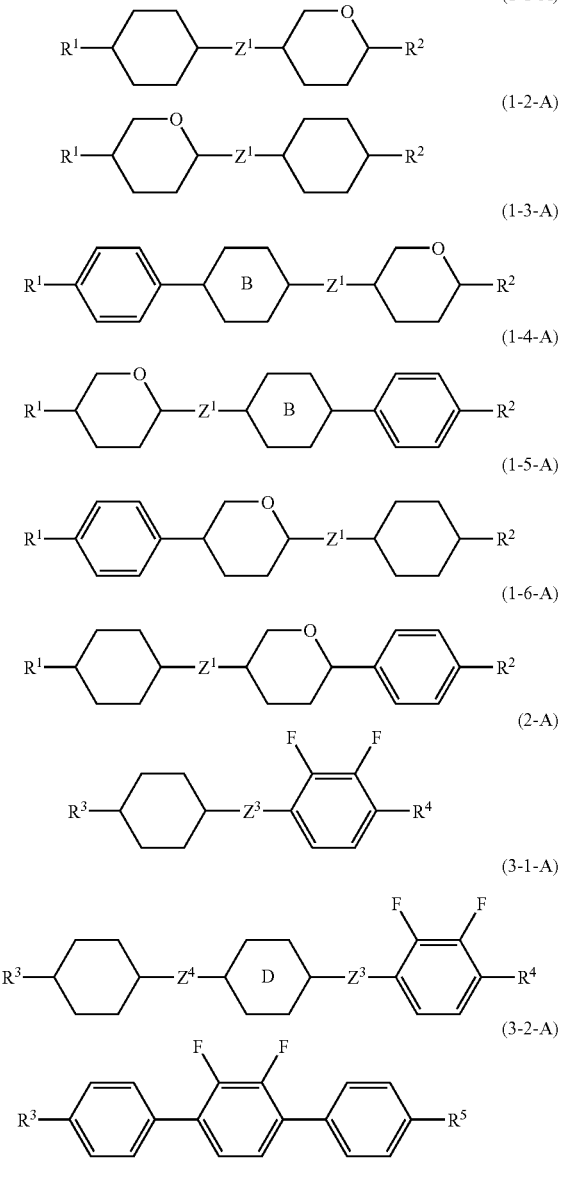

wherein $R^1$ and $R^2$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $Z^1$ is a single bond, —CH$_2$CH$_2$— or —CH═CH—; $Z^3$ and $Z^4$ are each independently a single bond or —CH$_2$CH$_2$—; and ring B and ring D are each independently 1,4-cyclohexylene or 1,4-phenylene.

6. The liquid crystal composition according to item 5, wherein the second component is at least one compound selected from the group of compounds represented by Formula (2-A); in Formula (2-A), $R^3$ is alkyl having 1 to 12 carbons or alkenyl having 2 to 12 carbons, and $R^4$ is alkoxy having 1 to 12 carbons; in Formula (3-1-A), $R^3$ is alkyl having 1 to 12 carbons or alkenyl having 2 to 12 carbons, $R^4$ is alkoxy having 1 to 2 carbons; and in Formula (3-2-A), $R^3$ and $R^5$ are each independently alkyl having 1 to 12 carbons.

7. The liquid crystal composition according to item 6, wherein in Formulas (1-1-A) to (1-6-A), $Z^1$ is a single bond, one of $R^1$ and $R^2$ is alkyl having 1 to 12 carbons, and the other is alkenyl having 2 to 12 carbons.

8. The liquid crystal composition according to item 7, wherein the first component is at least one compound selected from the group of compounds represented by Formulas (1-1-A) and (1-2-A), and the third component is at least one compound selected from the group of compounds represented by Formula (3-1-A).

9. The liquid crystal composition according to item 7, wherein the first component is at least one compound selected from the group of compounds represented by Formulas (1-3-A) to (1-6-A), and the third component is at least one compound selected from the group of compounds represented by Formula (3-1-A).

10. The liquid crystal composition according to item 7, wherein the first component is a mixture of at least one compound selected from the group of compounds represented by Formulas (1-1-A) and (1-2-A) and at least one compound selected from the group of compounds represented by Formulas (1-3-A) to (1-6-A), and the third component is at least one compound selected from the group of compounds represented by Formula (3-1-A).

11. The liquid crystal composition according to any one of items 5 to 10, wherein the ratio of the first component is from approximately 10% by weight to approximately 40% by weight, the ratio of the second component is from approximately 15% by weight to approximately 40% by weight, and the ratio of the third component is from approximately 20% by weight to approximately 50% by weight, based on the total weight of the liquid crystal composition.

12. The liquid crystal composition according to any one of items 5 to 11, wherein the composition further includes at least one compound selected from the group of compounds represented by Formulas (4-1-A) to (4-4-A) as a fourth component:

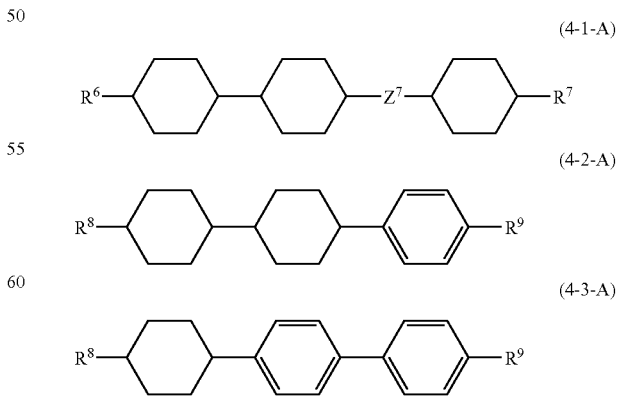

-continued

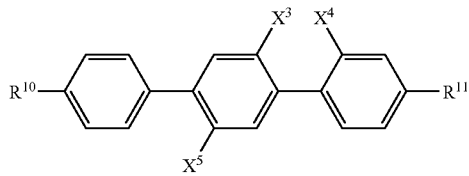

(4-4-A)

wherein $R^6$ to $R^{11}$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $X^3$, $X^4$ and $X^5$ are each independently fluorine or hydrogen, provided that at least one of $X^3$, $X^4$ and $X^5$ is fluorine; and $Z^7$ is —COO— or —CH$_2$O—.

13. The liquid crystal composition according to item 12, wherein in Formula (4-1-A), $R^6$ and $R^7$ are alkyl having 1 to 12 carbons, and $Z^7$ is —COO—; in Formulas (4-2-A) and (4-3-A), $R^8$ is alkenyl having 2 to 12 carbons, and $R^9$ is alkyl having 1 to 12 carbons; and in Formula (4-4-A), $R^{10}$ and $R^{11}$ are each independently alkyl having 1 to 12 carbons or alkenyl having 2 to 12 carbons, $X^3$ is fluorine, and $X^4$ and $X^5$ are hydrogen.

14. The liquid crystal composition according to item 12 or 13, wherein the fourth component is at least one compound selected from the group of compounds represented by Formula (4-2-A).

15. The liquid crystal composition according to item 12 or 13, wherein the fourth component is at least one compound selected from the group of compounds represented by Formula (4-4-A).

16. The liquid crystal composition according to any one of items 12 to 15, wherein the ratio of the first component is from approximately 10% by weight to approximately 40% by weight, the ratio of the second component is from approximately 15% by weight to approximately 40% by weight, the ratio of the third component is from approximately 20% by weight to approximately 50% by weight, and the ratio of the fourth component is from approximately 5% by weight to approximately 30% by weight, based on the total weight of the liquid crystal composition.

17. The liquid crystal composition according to any one of items 1 to 16, wherein the composition has a maximum temperature of a nematic phase of approximately 70° C. or more, a dielectric anisotropy (25° C.) at a frequency of 1 kHz of from approximately −6.0 to approximately −3.0, and a refractive index anisotropy (25° C.) at a wavelength of 589 nm of from approximately 0.08 to approximately 0.13.

18. A liquid display device that includes the liquid crystal composition according to any one of items 1 to 17.

19. The liquid crystal display device according to item 18, wherein the liquid crystal display device has an operation mode of a VA mode or an IPS mode, and has a driving mode of an active matrix mode.

The invention further includes: (1) the composition described above, wherein the composition further contains an optically active compound; (2) the composition described above, wherein the composition further includes an additive, such as an antioxidant, an ultraviolet light absorbent and/or a defoaming agent; (3) an AM device including the composition described above; (4) a device having an IPS or VA mode, includings the composition described above; (5) a device of a transmission type, including the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, additives that may be added to the composition will be explained. Seventh, the preparation methods of the component compound will be explained. Lastly, use of the composition will be explained.

First, the constitution of component compounds in the composition will be explained. The composition of the invention is classified into the composition A and the composition B. The composition A may further contain a liquid crystal compound, an additive, an impurity, and so forth. This liquid crystal compound is different from the compound (1-1), the compound (1-2), the compound (1-3), the compound (1-4), the compound (1-5), the compound (1-6), the compound (2), the compound (3-1), the compound (3-2), the compound (4-1-A), the compound (4-2-A), the compound (4-3-A) and the compound (4-4-A). Such a compound is mixed with the composition for the purpose of adjusting the characteristics of the composition. Among the liquid crystal compounds, an amount of a cyano compound is desirably small from the viewpoint of stability to heat or ultraviolet light. A further preferred ratio of the cyano compound is 0% by weight. The additive includes an optically active compound, an antioxidant, an ultraviolet light absorbent, a coloring matter, a defoaming agent and so forth. The impurity is a compound and so forth contaminated in the process such as the synthesis of a component compound and so forth.

The composition B essentially consists of the compounds selected from the compound (1-1), the compound (1-2), the compound (1-3), the compound (1-4), the compound (1-5), the compound (1-6), the compound (2), the compound (3-1), the compound (3-2), the compound (4-1-A), the compound (4-2-A), the compound (4-3-A) and the compound (4-4-A). The term "essentially" means that the composition does not contain a liquid crystal compound which is different from these compounds. The term "essentially" also means that the composition may further contain the additive, the impurity, and so forth. The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Second, the main characteristics of the component compounds and the main effects of the compounds on the composition will be explained. The main characteristics of the component compounds are summarized in Table 2 according to the advantages of the invention. In Table 2, the symbol L represents large or high, the symbol M represents a middle degree, and the symbol S represents small or low. The symbols L, M and S are classification based on qualitative comparison among the component compound.

TABLE 2

Characteristics of Compounds

| | Compound | | | | | | | | |
|---|---|---|---|---|---|---|---|---|---|
| | (1-1) and (1-2) | (1-3) to (1-6) | (2) | (3-1) | (3-2) | (4-1-A) | (4-2-A) | (4-3-A) | (4-4-A) |
| Maximum temperature | M | L | S | L | L | L | L | L | L |
| Viscosity | S | M | M | L | L | M | M | M | M |
| Optical anisotropy | S | M | M | M | L | S | M | M | L |
| Dielectric anisotropy | M[1)] | M[1)] | L[1)] | L[1)] | L[1)] | S | S | S | S |
| Specific resistance | L | L | L | L | L | L | L | L | L |

[1)]The dielectric anisotropy is negative, and the symbol shows magnitude of an absolute value.

The main effects of the component compounds to the characteristics of the composition upon mixing the component compounds to the composition are as follows. The compounds (1-1) and (1-2) increase the absolute value of the dielectric anisotropy, decrease the viscosity, and decreases the minimum temperature. The compounds (1-3) to (1-6) increase the absolute value of the dielectric anisotropy, increases the maximum temperature, decrease the viscosity, and decreases the minimum temperature. The compound (2) increases the absolute value of the dielectric anisotropy. The compounds (3-1) and (3-2) increase the absolute value of the dielectric anisotropy and increase the maximum temperature. The compounds (4-1-A), (4-2-A), (4-3-A) and (4-4-A) increase the maximum temperature, decrease the viscosity, and controls the refractive index anisotropy depending on the contents of the compounds.

Third, desirable ratios of the component compounds and the basis therefor will be explained. A desirable ratio of the first component is approximately 10% by weight or more for increasing the absolute value of the dielectric anisotropy, decreasing the minimum temperature, and decreasing the viscosity, and is approximately 40% by weight or less for decreasing the minimum temperature. A more desirable ratio is from approximately 10% by weight to approximately 35% by weight. A particularly desirable ratio is from approximately 10% to approximately 30%.

A desirable ratio of the second component is approximately 15% by weight or more for increasing the absolute value of the dielectric anisotropy, and is approximately 40% by weight or less for increasing the maximum temperature and decreasing the minimum temperature. A more desirable ratio is from approximately 20% by weight to approximately 40% by weight. A particularly desirable ratio is from approximately 20% by weight to approximately 30% by weight.

A desirable ratio of the third component is approximately 20% by weight or more for increasing the absolute value of the dielectric anisotropy and increasing the maximum temperature, and is approximately 50% by weight or less for decreasing the viscosity and decreasing the minimum temperature. A more desirable ratio is from approximately 25% by weight to approximately 50% by weight. A particularly desirable ratio is from approximately 30% by weight to approximately 50% by weight.

The fourth component is suitable for preparing a composition having a particularly small viscosity. A desirable ratio of the fourth component is from approximately 5% by weight to approximately 30% by weight. A more desirable ratio is from approximately 5% by weight to approximately 25% by weight. A particularly desirable ratio is from approximately 5% by weight to approximately 20% by weight.

In the composition A, a desirable total ratio of the first component, the second component, the third component and the fourth component is approximately 70% by weight or more for obtaining good characteristics. A more desirable total ratio is approximately 90% by weight or more. In the composition B described above, a total ratio of the four components is 100% by weight.

Fourth, a desirable embodiment of the component compound will be explained. $R^1$ and $R^2$ are each independently alkyl having 1 to 12 carbons, alkoxy having from 1 to 12 carbons, alkenyl having 2 to 12 carbons or alkenyl having 2 to 12, carbons, arbitrary hydrogen of which are replaced by fluorine. Desirable $R^1$ and $R^2$ are linear alkyl having 1 to 8 carbons, linear alkenyl having 2 to 8 carbons and linear alkenyl having 2 to 8 carbons, arbitrary hydrogen of which are replaced by fluorine, for increasing the maximum temperature, decreasing the minimum temperature, and decreasing the viscosity. More desirable $R^1$ and $R^2$ are such combinations that one of $R^1$ and $R^2$ is linear alkyl having 1 to 8 carbons, and the other is linear alkenyl having 2 to 8 carbons. $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine. Desirable $R^3$ is linear alkyl having 1 to 8 carbons, linear alkenyl having 2 to 8 carbons and linear alkenyl having 2 to 8 carbons, arbitrary hydrogen of which is replaced by fluorine, for increasing the maximum temperature and decreasing the viscosity. More desirable $R^3$ is linear alkyl having 1 to 8 carbons and linear alkenyl having 2 to 8 carbons. Desirable $R^4$ is linear alkyl having 1 to 12 carbons and linear alkoxy having 1 to 12 carbons for increasing the absolute value of the dielectric anisotropy. More desirable $R^4$ is linear alkoxy having 1 to 8 carbons. Particularly desirable $R^4$: is linear alkoxy having 1 to 4 carbons. Desirable $R^5$ is linear alkyl having 1 to 8 carbons, linear alkenyl having 2 to 8 carbons and linear alkenyl having 2 to 8 carbons, arbitrary hydrogen of which are replaced by fluorine, for increasing the maximum temperature and decreasing the viscosity. More desirable $R^5$ is linear alkyl having 1 to 8 carbons and linear alkenyl having 2 to 8 carbons. Particularly desirable $R^5$ is linear alkyl having 1 to 8 carbons. $R^6$ to $R^{11}$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine. Desirable $R^6$ and $R^7$ are linear alkyl having 1 to 8 carbons, linear alkenyl having 2 to 8 carbons and linear alkenyl having 2 to 8 carbons, arbitrary hydrogen of which is replaced by fluorine, for increasing the maximum temperature and decreasing the viscosity. More desirable $R^6$ and $R^7$ are linear alkyl having 1 to 5 carbons and linear alkenyl having 2 to 5 carbons. Particularly desirable $R^6$ and $R^7$ are linear alkyl having 1 to 5 carbons. Desirable $R^8$ is linear alkyl having 1 to 12 carbons, linear alkenyl having 2 to 12 carbons and linear alkenyl having 2 to 12 carbons, arbitrary hydrogen of which are replaced by fluorine, for increasing the maximum temperature, decreasing the minimum temperature, and decreasing the viscosity. More desirable $R^8$ is linear alkyl having 1 to 12 carbons and linear alkenyl having 2 to 12 carbons. Particularly desirable $R^8$ is linear alkenyl having 2 to 12 carbons. Desirable $R^9$ is linear alkyl having 1 to 12 carbons or linear alkoxy having 1 to 12 carbons for increasing the maximum temperature, decreasing the minimum temperature, and decreasing the viscosity. More desirable $R^9$ is linear alkyl having 1 to 5 carbons. Desirable $R^{10}$ and $R^{11}$ are linear alkyl having 1 to 12 carbons and linear alkenyl having 2 to 12 carbons for increasing the maximum temperature, decreasing the minimum temperature, and decreasing the viscosity. More desirable $R^{10}$ and $R^{11}$ are linear alkyl having 1 to 5 carbons and linear alkenyl having 2 to 5 carbons.

Desirable alkyl is methyl, ethyl, propyl, butyl, pentyl, hexyl, heptyl, or octyl. More desirable alkyl is ethyl, propyl, butyl, pentyl, or heptyl for decreasing the viscosity.

Desirable alkoxy is methoxy, ethoxy, propoxy, butoxy, pentyloxy, hexyloxy, or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing the viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Preferred examples of alkenyl, arbitrary hydrogen of which is replaced by fluorine, include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples thereof include 2,2-difluorovinyl and 4,4-difluoro-3-butenyl for decreasing the viscosity.

Ring A, ring B, ring C and ring D are each independently 1,4-cyclohexylene or 1,4-phenylene. Desirable ring A is 1,4-cyclohexylene for increasing the maximum temperature, decreasing the minimum temperature, and decreasing the viscosity. Desirable ring B is 1,4-phenylene in the case where a large refractive index anisotropy is demanded, and is 1,4-cyclohexylene in the case where a small refractive index anisotropy is demanded. Desirable ring C is 1,4-cyclohexylene and 1,4-phenylene for increasing an absolute value of the dielectric anisotropy. Desirable ring D is 1,4-cyclohexylene and 1,4-phenylene for increasing an absolute value of the dielectric anisotropy. On the configuration of 1,4-cyclohexylene in the compounds, trans is preferable to cis for increasing the maximum temperature.

$Z^1$ and $Z^2$ are each independently a single bond, —CH$_2$CH$_2$— or —CH=CH—. Desirable $Z^1$ and $Z^2$ are a single bond for decreasing the minimum temperature and decreasing the viscosity. $Z^3$ to $Z^6$ are each independently a single bond or —CH$_2$CH$_2$—. Desirable $Z^3$ is a single bond and —CH$_2$CH$_2$— for increasing the absolute value of the dielectric anisotropy. More desirable $Z^3$ is a single bond. Desirable $Z^4$ is a single bond for decreasing the minimum temperature. Desirable $Z^5$ and $Z^6$ are a single bond for decreasing the viscosity. $Z^7$ is —COO— or —CH$_2$O—. Desirable $Z^7$ is —COO— for decreasing the minimum temperature.

$X^1$ and $X^2$ are each independently fluorine or chlorine, provided that at least one of $X^1$ and $X^2$ is fluorine. Desirable $X^1$ is fluorine for increasing the absolute value of the dielectric anisotropy. Desirable $X^2$ is fluorine or chlorine for increasing the absolute value of the dielectric anisotropy. Desirable $X^2$ is fluorine. $X^3$, $X^4$ and $X^5$ are each independently fluorine or hydrogen, provided that at least one of $X^3$, $X^4$ and $X^5$ is fluorine. Desirable combinations of $X^3$, $X^4$ and $X^5$ are a combination of fluorine, hydrogen and hydrogen, a combination of hydrogen, fluorine and hydrogen, and a combination of fluorine, hydrogen and fluorine, in this order, for increasing the maximum temperature, decreasing the minimum temperature, and decreasing the viscosity. A more desirable combination of $X^3$, $X^4$ and $X^5$ is a combination of fluorine, hydrogen and hydrogen in this order.

Fifth, examples of the component compound will be shown. In the desirable compounds described below, $R^{12}$ is linear alkyl having 1 to 12 carbons, $R^{13}$ is linear alkyl having 1 to 12 carbons or linear alkoxy having 1 to 12 carbons, and $R^{14}$ is linear alkenyl having 2 to 12 carbons or linear alkenyl having 2 to 12 carbons, arbitrary hydrogen of which are replaced by fluorine. $R^1$, $R^2$, $R^3$, $R^4$, $R^5$, $R^6$, $R^7$, $R^{10}$ and $R^{11}$ have the same meanings as above. In these compounds, trans is preferable to cis for the configuration of 1,4-cyclohexylene for increasing the maximum temperature.

Desirable compounds (1-1) are the compounds (1-1-1) to (1-1-6). A more desirable compound (1-1) is the compound (1-1-1). Desirable compounds (1-2) are the compounds (1-2-1) to (1-2-6). A more desirable compound (1-2) is the compound (1-2-1). Desirable compounds (1-3) are the compounds (1-3-1) to (1-3-7). More desirable compounds (1-3) are the compounds (1-3-1) and (1-3-5). Desirable compounds (1-4) are the compounds (1-4-1) to (1-4-7). More desirable compounds (1-4) are the compounds (1-4-1) and (1-4-5). Desirable compounds (1-5) are the compounds (1-5-1) to (1-5-4). A more desirable compound (1-5) is the compound (1-5-1). Desirable compounds (1-6) are the compounds (1-6-1) to (1-6-4). A more desirable compound (1-6) is the compound (1-6-1). For the first component, the compounds (1-1) and (1-2) are desirable to the compounds (1-3) to (1-6) from the standpoint of a negatively low dielectric anisotropy and a low minimum temperature. Desirable compounds (2) are the compounds (2-1) to (2-6). More desirable compounds (2) are the compounds (2-1), (2-2) and (2-3). A particularly desirable compound (2) is the compound (2-1). Desirable compounds (3-1) are the compounds (3-1-1 to (3-1-18). More desirable compounds (3-1) are the compounds (3-1-1), (3-1-2), (3-1-4), (3-1-7) and (3-1-10). Particularly desirable compounds (3-1) are the compounds (3-1-1) and (3-1-4). Desirable compounds (3-2) are the compounds (3-2-1) to (3-2-7). A more desirable compound (3-2) is the compound (3-2-1). Desirable compounds (4-1-A) are the compounds (4-1-1) and (4-1-2). A more desirable compound (4-1-A) is the compound (4-1-1). Desirable compounds (4-2-A) are the compounds (4-2-1) and (4-2-2). A more desirable compound (4-2-A) is the compound (4-2-2). Desirable compounds (4-3-A) are the compounds (4-3-1) and (4-3-2). A more desirable compound (4-3-A) is the compound (4-3-2). Desirable compounds (4-4-A) are the compounds (4-4-1) to (4-4-3). A more desirable compound (4-4-A) is the compound (4-4-1).

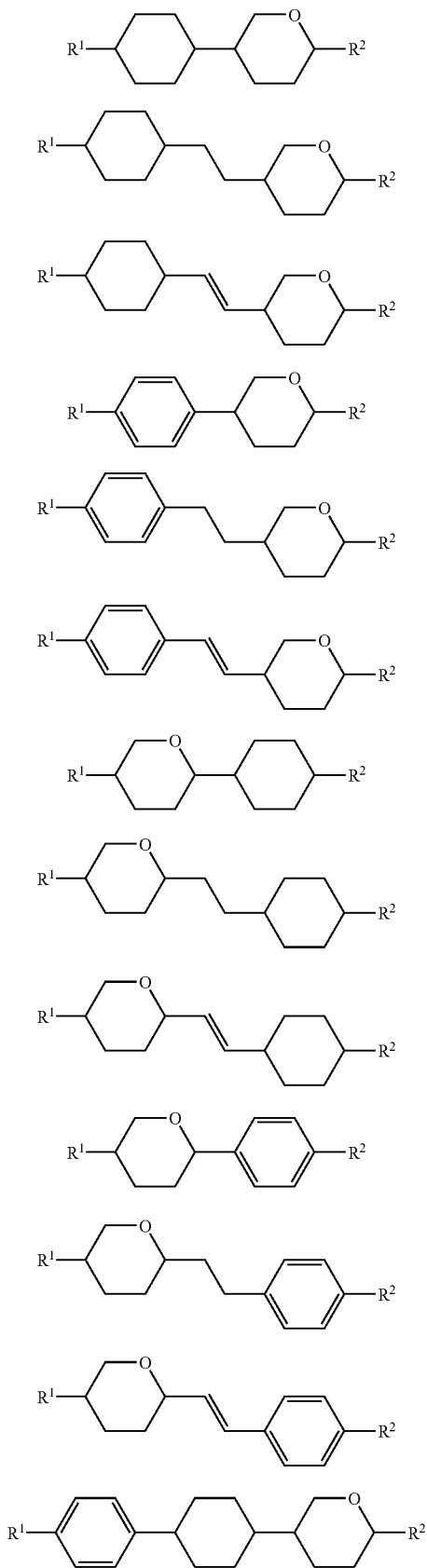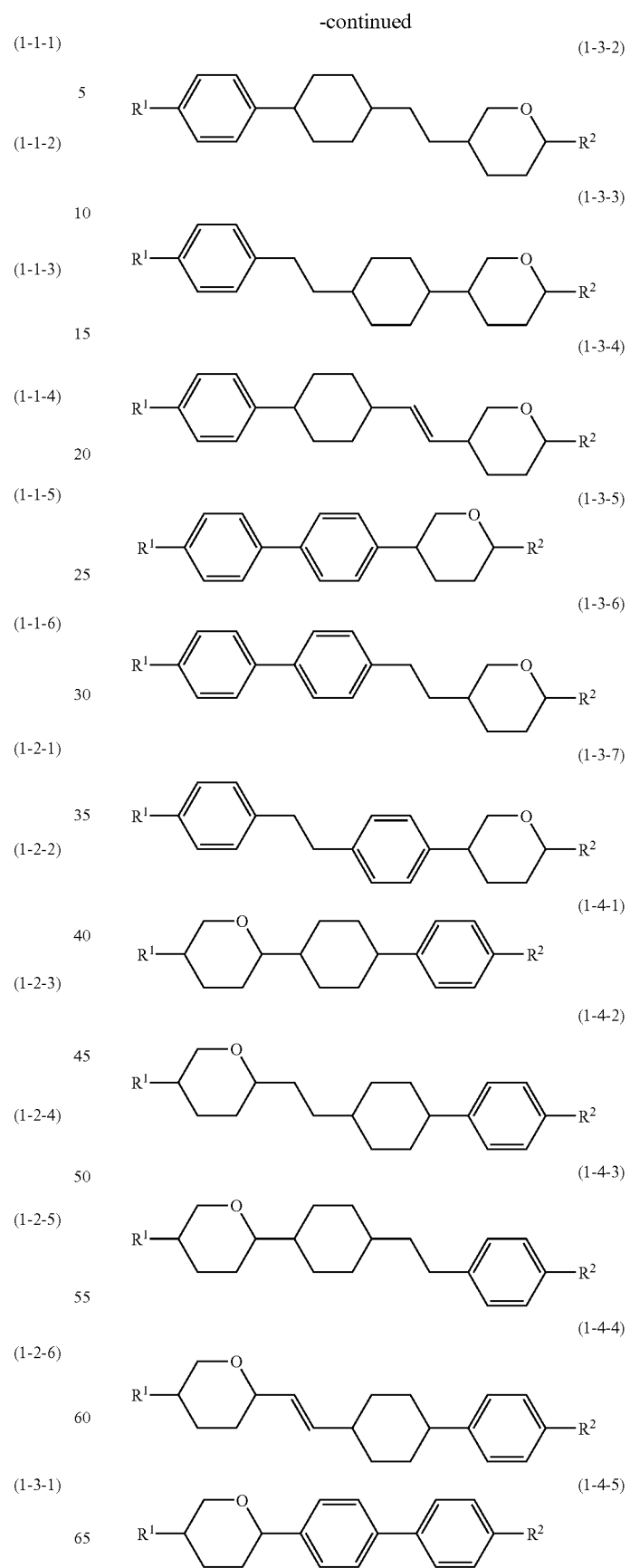

-continued
(1-4-6)
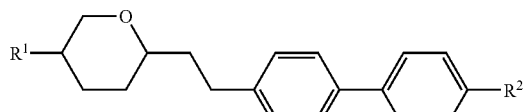
(1-4-7)
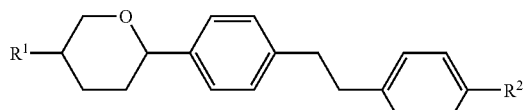
(1-5-1)
(1-5-2)
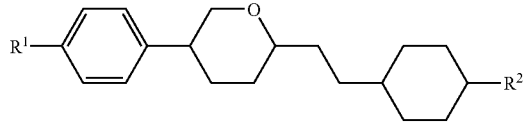
(1-5-3)
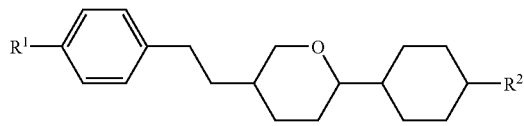
(1-5-4)
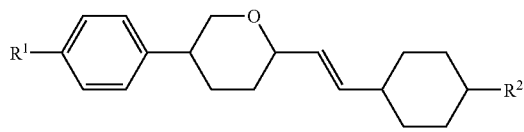
(1-6-1)
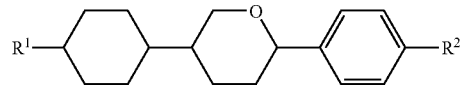
(1-6-2)
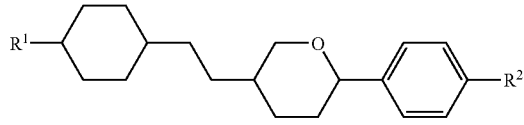
(1-6-3)
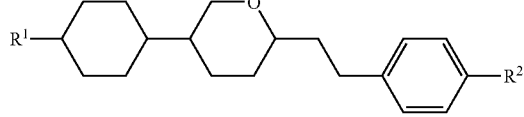
(1-6-4)
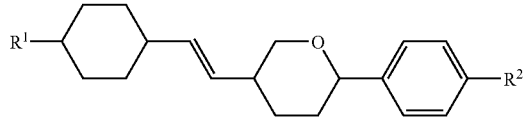
(2-1)
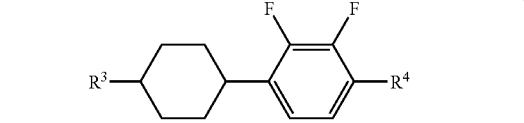
(2-2)
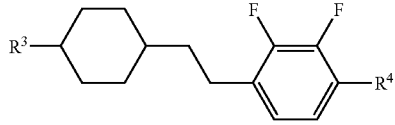
(2-3)
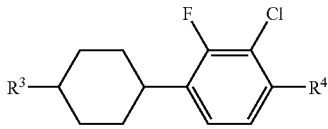
(2-4)
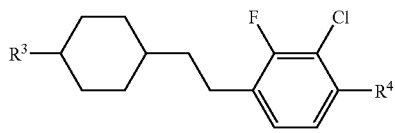
(2-5)
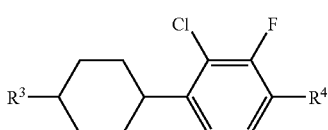
(2-6)
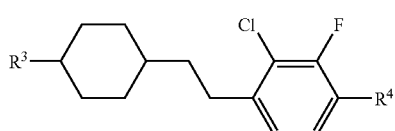
(3-1-1)
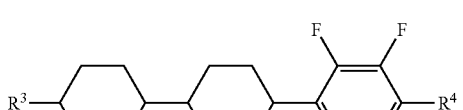
(3-1-2)
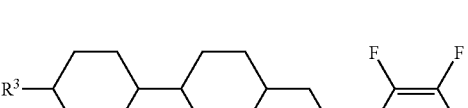
(3-1-3)
(3-1-4)
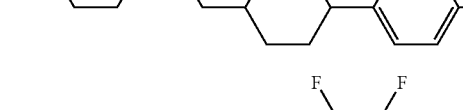
(3-1-5)
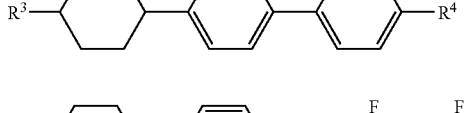
(3-1-6)
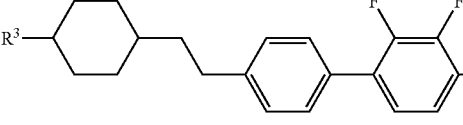

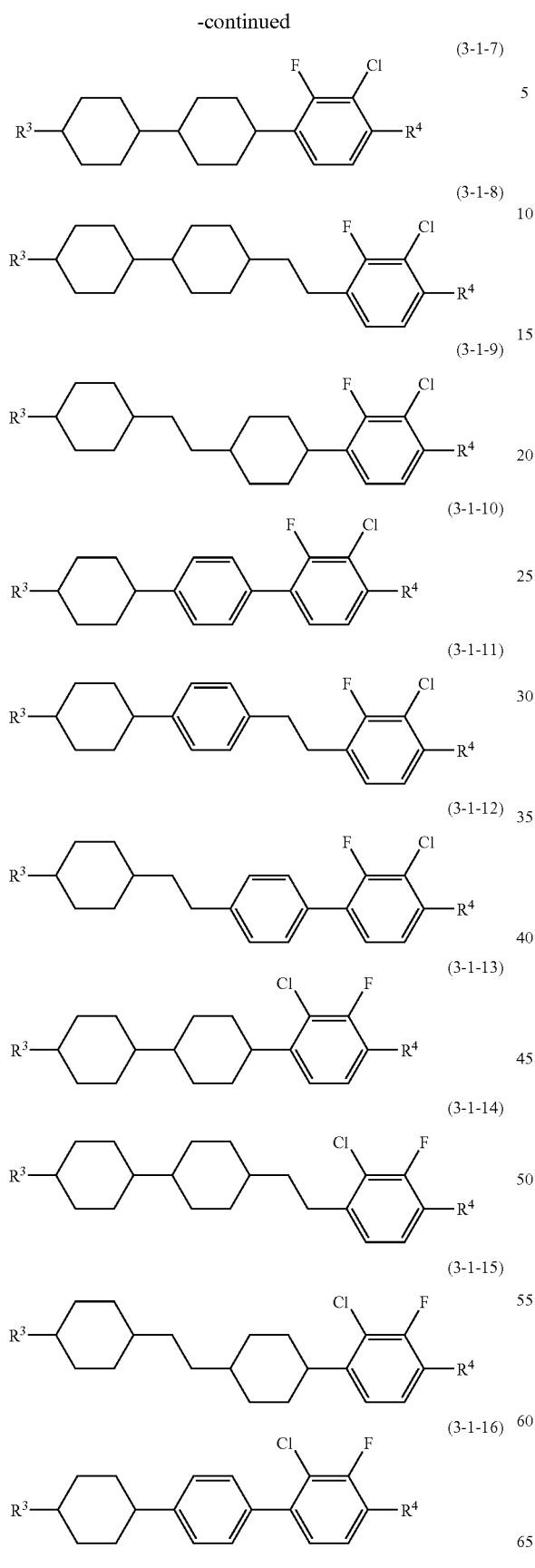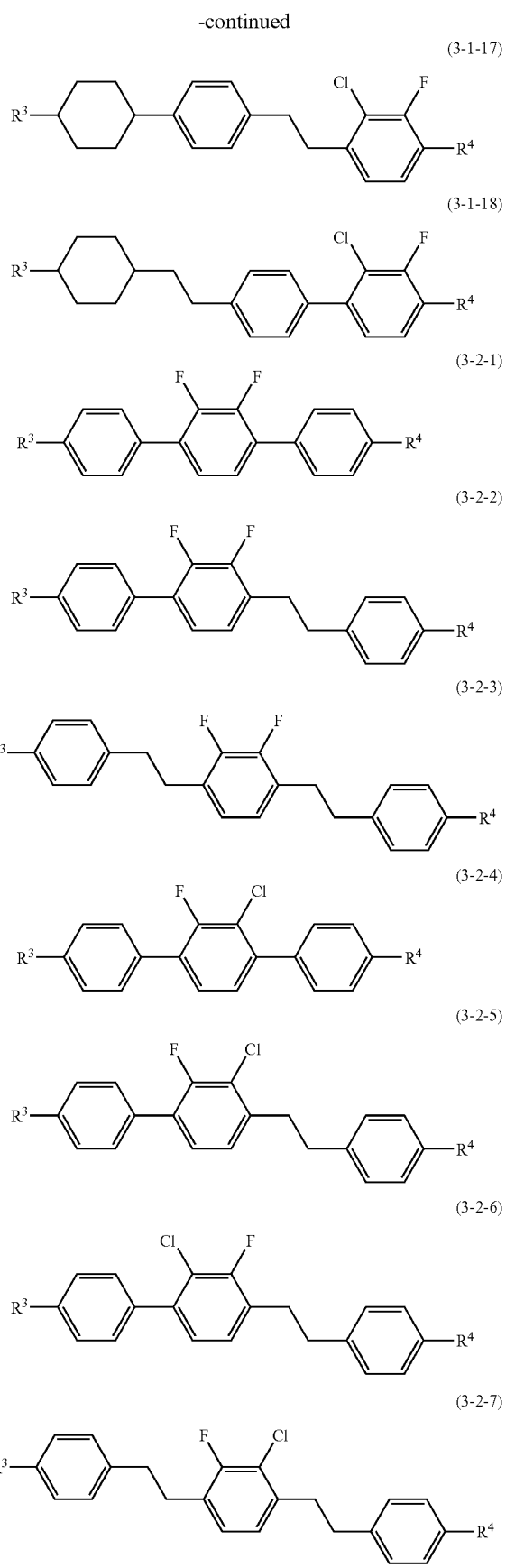

-continued

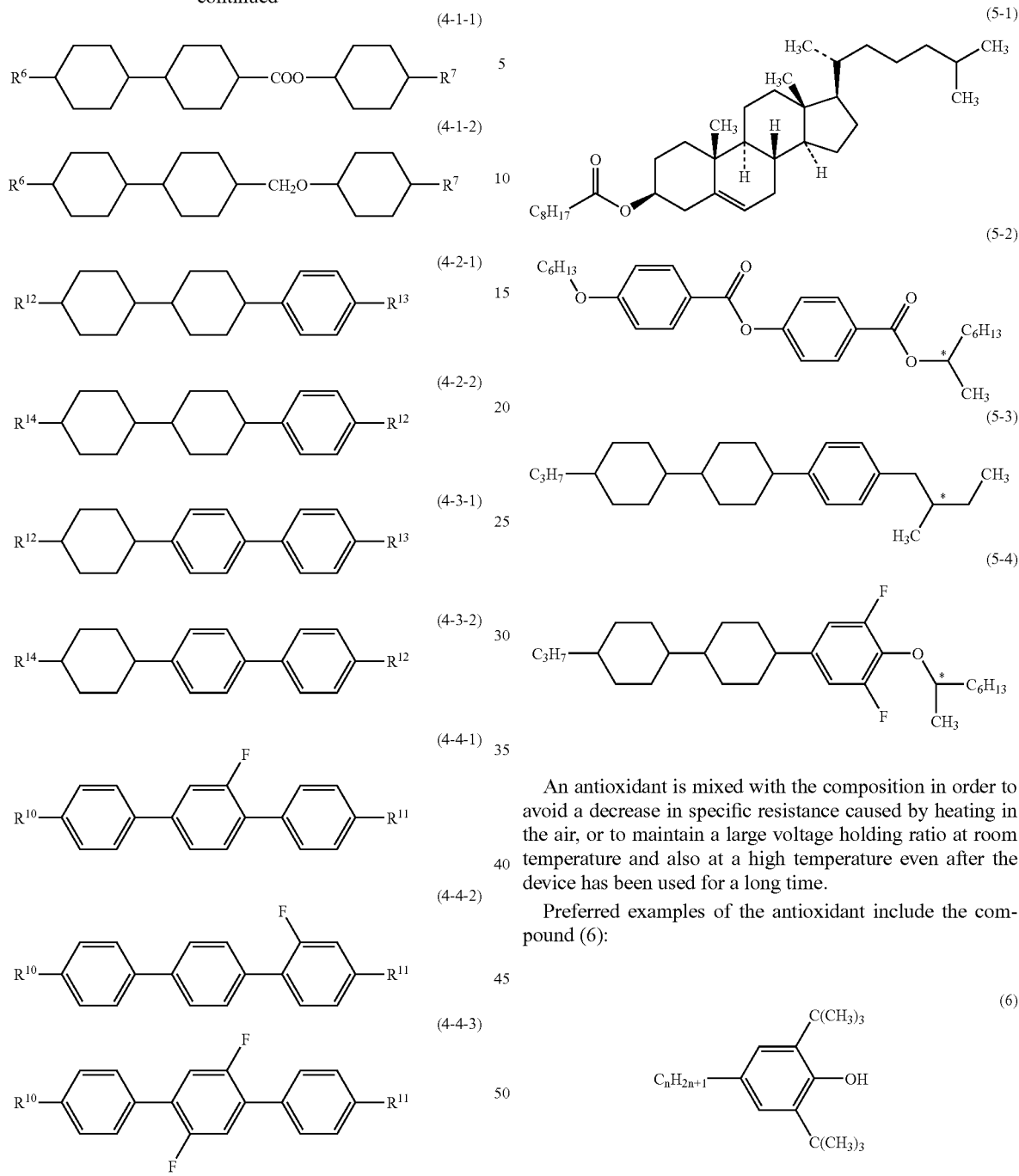

Sixth, additives capable of being mixed with the composition will be explained. The additives include an optically active compound, an antioxidant, an ultraviolet light absorbent, a coloring matter, a defoaming agent and so forth. An optically active compound is mixed in the composition for inducing a helical structure of liquid crystal to provide a twist angle. Examples of the optically active compound include the compounds (5-1) to (5-4) below. A desirable ratio of the optically active compound is approximately 5% by weight or less, and a more desirable ratio thereof ranges from approximately 0.01% by weight to approximately 2% by weight.

An antioxidant is mixed with the composition in order to avoid a decrease in specific resistance caused by heating in the air, or to maintain a large voltage holding ratio at room temperature and also at a high temperature even after the device has been used for a long time.

Preferred examples of the antioxidant include the compound (6):

wherein n is an integer of from 1 to 9. In the compound (6), desirable n are 1, 3, 5, 7, or 9. More desirable n are 1 or 7. When n is 1, the compound (6) has a large volatility, and is effective in preventing the decrease of specific resistance caused by heating in the air. When n is 7, the compound (6) has a small volatility, and is effective in maintaining a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the ultraviolet light absorbent include a benzophenone derivative, a benzoate derivative and a triazole derivative. A light stabilizer, such as an amine having steric hindrance is also desirable. A desirable ratio of the absorbent and the stabilizer is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 10,000 ppm.

A dichroic dye such as an azo dye or an anthraquinone dye is mixed with the composition to suit for a device of a guest host (GH) mode. A desirable ratio of the dye ranges from approximately 0.01% by weight to approximately 10% by weight. A defoaming agent such as dimethyl silicone oil or methylphenyl silicone oil is mixed with the composition. A desirable ratio of the defoaming agent is approximately 1 ppm or more for obtaining the advantage thereof and is approximately 1,000 ppm or less for preventing display failure from occurring. A more desirable ratio thereof ranges from approximately 1 ppm to approximately 500 ppm.

Seventh, the preparation methods of the component compounds will be explained. These compounds can be prepared by known methods. The preparation method will be exemplified below. The compounds (1-1-1) and (1-3-1) are prepared by the method disclosed in WO 2006-038522 A/2006. The compound (2-1) is prepared by the method disclosed in JP H2-5034431 A/1990. The compound (3-1-4) is prepared by the method disclosed in JP H4-46934 B/1992. The compound (3-2-1) is prepared by the method disclosed in JP H2-501071 A/1990. The compound (4-1-1) is prepared by the method disclosed in JP S54-106454A/1979. The compound (4-2-1) is prepared by the method disclosed in JP S57-165328 A/1982. The compound (4-2-2) is prepared by the method disclosed in JP H4-30382 B/1992. The compound (4-4-1) is prepared by the method disclosed in JP S60-51135 A/1985. The antioxidant is commercially available. The compound (6), wherein n is 1, is available, for example, from Sigma-Aldrich, Inc. The compound (5), wherein n is 7, is prepared by the method disclosed in U.S. Pat. No. 3,660,505.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. Most of the compositions have a minimum temperature of approximately −10° C. or less, a maximum temperature of 70° C. or more, and an optical anisotropy of approximately 0.07 to approximately 0.20. The device containing the composition has a large voltage holding ratio. The composition is suitable for an AM device. The composition is suitable especially for an AM device of a transmission type. The composition having an optical anisotropy of approximately 0.08 to approximately 0.25 and further having an optical anisotropy of approximately 0.10 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an AM or device or a PM device having a mode such as PC, TN, STN, ECB, OCB, IPS, VA, and so forth. It is desirable to use the composition for an AM device having a mode of VA or IPS. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: (extrapolated value)={(value measured)−0.85×(value measured for mother liquid crystals)}/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

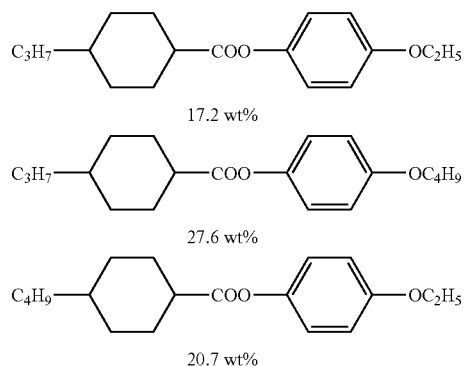

-continued

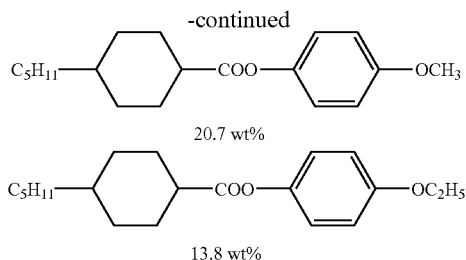

20.7 wt%

13.8 wt%

Measurement of the characteristics was carried out according to the following methods. Most methods are described in the Standard of Electric Industries Association of Japan, EIAJ.ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as $\leq -20°$ C. A lower limit of a temperature range of a nematic phase may be abbreviated to "a minimum temperature."

Viscosity ($\eta$; measured at 20° C., mPa·s): A viscosity was measured by means of an E-type viscometer.

Optical Anisotropy ($\Delta n$; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. The refractive index ($n\|$) was measured when the direction of a polarized light was parallel to that of the rubbing. The refractive index ($n\perp$) was measured when the direction of a polarized light was perpendicular to that of the rubbing. A value of optical anisotropy was calculated from the equation: $\Delta n = n\| - n\perp$.

Dielectric Anisotropy ($\Delta \epsilon$; measured at 25° C.): A value of a dielectric anisotropy was calculated from the equation: $\Delta \epsilon = \epsilon\| - \epsilon\perp$. The values of dielectric anisotropy ($\epsilon\|$ and $\epsilon\perp$) were measured in the following manner.

(1) Measurement of dielectric anisotropy ($\epsilon\|$): A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A sample was charged in a VA device having a distance (cell gap) of 4 μm between two sheets of the glass substrates, and the device was sealed with an adhesive capable of being cured with ultraviolet light. Sine waves (0.5 V, 1 kHz) were applied to the device, and after lapsing two seconds, a dielectric constant ($\epsilon\|$) in the major axis direction of the liquid crystal molecule was measured.

(2) Measurement of dielectric anisotropy ($\epsilon\perp$): Polyimide was coated on a glass substrate having been well cleaned. The glass substrate was baked, and the resulting orientation film was subjected to a rubbing treatment. A sample was charged in a TN device having a distance between two sheets of the glass substrates of 9 μm and a twisted angle of 80°. Sine waves (0.5 V, 1 kHz) were applied to the device, and after lapsing two seconds, a dielectric constant ($\epsilon\perp$) in the minor axis direction of the liquid crystal molecule was measured.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a VA device of a normally black mode, in which a cell gap between two glass plates was 4 μm, and a rubbing direction was antiparallel, and the device was sealed with a UV curing adhesive. The voltage to be applied onto the device (60 Hz, rectangular waves) was increased stepwise by 0.02 V starting from 0 V up to 20 V During the stepwise increasing, the device was irradiated with light in a perpendicular direction, and an amount of the light passing through the device was measured. A voltage-transmission curve was prepared, in which a maximum amount of a light corresponded to 100% transmittance, a minimum amount of a light corresponded to 0% transmittance. The threshold voltage is a value at 10% transmittance.

Voltage Holding Ratio (VHR-1; measured at 25° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5 V). The decreasing voltage was measured for 16.7 milliseconds with High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5 V). The decreasing voltage was measured for 16.7 milliseconds with High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-3; measured at 25° C.; %): After irradiating with ultraviolet light, a voltage holding ratio was measured to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 16.7 milliseconds. A VHR-3 is desirably 90% or more, and more desirably 95% or more.

Voltage Holding Ratio (VHR-4; measured at 25° C.; %): A voltage holding ratio was measured after heating an TN device having a sample poured therein in a constant-temperature bath at 80° C. for 500 hours to evaluate stability to heat. A composition having large VHR-4 has a large stability to heat. In measurement of VHR-4, a decreasing voltage is measured for 16.7 milliseconds.

Response Time ($\tau$; measured at 25° C.; ms): Measurement was carried out with LCD Evaluation System Model LCD-5100 made by Otsuka Electronics Co., Ltd. The light source is a halogen lamp. Low-pass filter was set at 5 kHz. A sample was poured into a VA device of a normally black mode, in which a cell gap between two glass plates was 4 µm, and a rubbing direction was antiparallel, and the device was sealed with a UV curing adhesive. Rectangle waves (60 Hz, 10 V, 0.5 seconds) were applied to the device. During application, the device was irradiated with light in a perpendicular direction, and an amount of the light passing through the device was measured. A maximum amount of a light corresponds to 100% transmittance, and a minimum amount of a light corresponds to 0% transmission. The rise time is a period of time required for the change in transmittance from 90% to 10% (fall time: ms).

Specific Resistance (ρ; measured at 25° C.; Ωcm): A 1.0 mL of a sample was charged in a vessel equipped with electrodes. A direct current voltage of 10 V was applied to the vessel, and after lapsing 10 second from the application of voltage, the direct electric current was measured. The specific resistance was calculated by the equation: (specific resistance)={(voltage)×(electric capacity of vessel)}/{(direct current)×(dielectric constant of vacuum)}.

Gas Chromatographic Analysis: A Gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was Chromatopac Model C-R5A made by Shimadzu or its equivalent. The gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used.

The ratios of the liquid crystal compounds contained in the composition can also be calculated in the following manner. A liquid crystal compound can be detected by gas chromatography. An area ratio of peaks on a gas chromatogram corresponds to a ratio (molar number) of liquid crystal compounds. In the case where the aforementioned capillary columns are used, correction coefficients of the liquid crystal compounds can be regarded as 1. Accordingly, the ratio (% by weight) of liquid crystal compounds is calculated from the area ratio of peaks.

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene is trans. The parenthesized number next to the symbolized compounds in the Examples corresponds to the number of the desirable compound. The symbol (-) means other liquid crystal compound. A ratio (percentage) of a liquid crystal composition is percentage by weight (% by weight) based on the total weight of a liquid crystal composition, and the liquid crystal composition contains impurities in addition to the compounds described. Finally, the characteristics of the compositions are described.

TABLE 3

Method of Description of Compound using Symbols.
$R—(A_1)—Z_1— - - —Z_n—(A_n)—R'$

| 1) Left Terminal Group R— | Symbol |
|---|---|
| $C_nH_{2n+1}—$ | n- |
| $C_nH_{2n+1}O—$ | nO- |
| $C_mH_{2m+1}OC_nH_{2n}—$ | mOn- |
| $CH_2=CH—$ | V- |
| $C_nH_{2n+1}CH=CH—$ | nV- |
| $CH_2=CH—C_nH_{2n}—$ | Vn- |
| $C_mH_{2m+1}—CH=CH—C_nH_{2n}—$ | mVn- |
| $CH_2=CH—C_2H_4—CH=CH—C_2H_4—$ | V2V2- |
| $CF_2=CH—$ | VFF- |
| $CF_2=CH—C_2H_4—$ | VFF2- |

| 2) Right Terminal Group —R' | Symbol |
|---|---|
| $—C_nH_{2n+1}$ | -n |
| $—OC_nH_{2n+1}$ | -On |
| $—CH=CH_2$ | -V |
| $—CH=CHC_nH_{2n+1}$ | -Vn |
| $—C_nH_{2n}CH=CH_2$ | -nV |
| $—CH=CF_2$ | -VFF |
| $—COO—CH_3$ | -EME |

| 3) Bonding group -Zn- | Symbol |
|---|---|
| $—C_2H_4—$ | 2 |
| $—COO—$ | E |
| $—CH=CH—$ | V |
| $—CH_2O—$ | 1O |

| 4) Ring Structure -An- | Symbol |
|---|---|
|  | H |
| 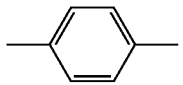 | B |
| 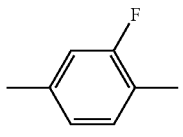 | B(F) |
| 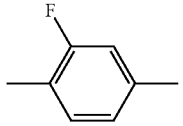 | B(2F) |
| 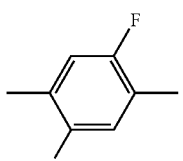 | B(2F,5F) |

TABLE 3-continued

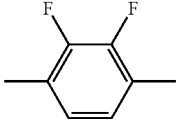

5) Example of Description

Example 1

3-Hdh-V

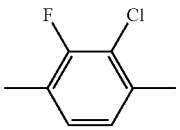

Example 2

1V2-HBB(2F,3F)-O2

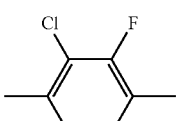

Example 3

3-HBB(2F,3Cl)-O2

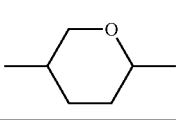

Example 4

2-BB(F)B-3

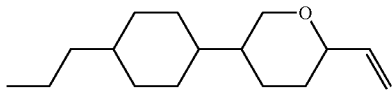

Comparative Example 1

The following composition claimed in JP H11-140447 A/1999 were prepared and measured for characteristics.

| | | |
|---|---|---|
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| V-HHB-1 | (4-2-2) | 5% |
| 2-BB(F)B-3 | (4-4-1) | 5% |
| V-HH-3 | (—) | 20% |

NI=79.3° C.; Tc$\leqq$−20° C.; $\Delta$n=0.091; $\Delta\epsilon$=−3.3; $\eta$=20.0 mPa·s; Vth=2.19 V; VHR-1=99.0%; VHR-2=98.7%; VHR-3=98.8%; VHR-4=98.6%.

Comparative Example 2

WO 2006-038522 A/2006 discloses the composition example 9 as a negative composition containing a compound having a skeleton similar to the first component of the invention, a compound of the second component of the invention, and a compound of the third component of the invention.

| | | |
|---|---|---|
| 5-Hdh2H-2 | (—) | 4% |
| 2-HdhH-3 | (—) | 4% |
| 3-HB(2F,3F)-O2 | (2-1) | 10% |
| 5-HB(2F,3F)-O2 | (2-1) | 10% |
| 2-HHB(2F,3F)-1 | (3-1-1) | 4% |
| 3-HHB(2F,3F)-2 | (3-1-1) | 4% |
| 3-HHB(2F,3F)-O2 | (3-1-1) | 12% |
| 5-HHB(2F,3F)-O2 | (3-1-1) | 10% |
| 3-HHEH-3 | (4-1-1) | 4% |
| 3-HHEH-5 | (4-1-1) | 3% |
| 4-HHEH-3 | (4-1-1) | 3% |
| 3-HH-4 | (—) | 5% |
| 3-HH-5 | (—) | 5% |
| 3-HH-O1 | (—) | 6% |
| 3-HH-O3 | (—) | 6% |
| 3-HB-O1 | (—) | 5% |
| 3-HB-O2 | (—) | 5% |

NI=85.6° C.; Tc$\leqq$0° C.; $\Delta$n=0.075; $\eta$=27.4 mPa·s; $\Delta\epsilon$=−3.3.

Example 1

The composition of Example 1 had an equivalent maximum temperature, a particularly low minimum temperature and a negatively low $\Delta\epsilon$, as compared to the composition of Comparative Example 1.

| | | |
|---|---|---|
| 3-Hdh-V | (1-1-1) | 16% |
| 3-HB(2F,3F)-O2 | (2-1) | 15% |
| 5-HB(2F,3F)-O2 | (2-4) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| V-HHB-1 | (4-2-2) | 9% |
| 2-BB(F)B-3 | (4-4-1) | 5% |

NI=80.3° C.; Tc≦−40° C.; Δn=0.094; Δε=−3.8; η=25.2 mPa·s; Vth=2.10 V; VHR-1=99.1%; VHR-2=98.7%; VHR-3=98.8%; VHR-4=98.6%.

Example 2

The composition of Example 2 had an equivalent maximum temperature, a particularly low minimum temperature and a negatively low Δε, as compared to the composition of Comparative Example 2.

| | | |
|---|---|---|
| 3-BHdh-V | (1-3-1) | 9% |
| 3-BHdh-3 | (1-3-1) | 5% |
| 3-HB(2F,3F)-O2 | (2-1) | 15% |
| 5-HB(2F,3F)-O2 | (2-1) | 13% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 2-HH-5 | (—) | 5% |
| V-HH-3 | (—) | 10% |
| 3-HB-O2 | (—) | 3% |

NI=85.4° C.; Tc≦−20° C.; Δn=0.085; η=26.1 mPa·s; Δε=−3.6.

Example 3

| | | |
|---|---|---|
| 3-Hdh-V | (1-1-1) | 25% |
| 3-Hdh-1V | (1-1-1) | 5% |
| 3-HB(2F,3F)-O2 | (2-1) | 10% |
| 5-HB(2F,3F)-O2 | (2-1) | 11% |
| 1V2-HB(2F,3F)-O2 | (2-1) | 5% |
| 3-HHB(2F,3F)-O2 | (3-1-1) | 11% |
| 5-HHB(2F,3F)-O2 | (3-1-1) | 6% |
| 1V2-HHB(2F,3F)-O2 | (3-1-1) | 5% |
| 2-HHB(2F,3F)-1 | (3-1-1) | 11% |
| 3-HHB(2F,3F)-1 | (3-1-1) | 11% |

NI=70.2° C.; Tc≦−40° C.; Δn=0.079; Δε=−3.5; η=25.4 mPa·s; VHR-1=99.0%; VHR-2=98.5%; VHR-3=98.8%.

Example 4

| | | |
|---|---|---|
| 3-Hdh-V | (1-1-1) | 14% |
| 3-HB(2F,3F)-O2 | (2-1) | 14% |
| 5-HB(2F,3F)-O2 | (2-1) | 14% |
| 3-HHB(2F,3F)-O2 | (3-1-1) | 11% |
| 5-HHB(2F,3F)-O2 | (3-1-1) | 11% |
| 2-HHB(2F,3F)-1 | (3-1-1) | 10% |
| 3-HHB(2F,3F)-1 | (3-1-1) | 10% |
| 2-BB(F)B-3 | (4-4-1) | 8% |
| 2-BB(F)B-5 | (4-4-1) | 4% |
| 1-BB(F)B-2V | (4-4-1) | 4% |

NI=84.2° C.; Tc≦−30° C.; Δn=0.114; Δε=−3.7; η=29.4 mPa·s.

Example 5

| | | |
|---|---|---|
| 3-Hdh-V | (1-1-1) | 15% |
| 5-Hdh-V | (1-1-1) | 5% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 3-HHEH-3 | (4-1-1) | 3% |
| 3-HHEH-5 | (4-1-1) | 3% |
| 4-HHEH-3 | (4-1-1) | 4% |

NI=80.9° C.; Tc≦−40° C.; Δn=0.081; Δε=−3.9; η=25.3 mPa·s.

Example 6

| | | |
|---|---|---|
| 3-Hdh-V | (1-1-1) | 10% |
| 3-HB(2F,3F)-O2 | (2-1) | 15% |
| 5-HB(2F,3F)-O2 | (2-1) | 13% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 3-HHB-3 | (4-2-1) | 7% |
| 2-HH-5 | (—) | 5% |
| 3-HB-O2 | (—) | 5% |
| 5-HB-O2 | (—) | 5% |

NI=76.3° C.; Tc≦−30° C.; Δn=0.085; Δε=−3.4; VHR-1=99.2%; VHR-2=98.9%; VHR-3=98.2%.

Example 7

| | | |
|---|---|---|
| 3-Hdh-V | (1-1-1) | 10% |
| 3-HB(2F,3Cl)-O2 | (2-3) | 12% |
| 5-HB(2F,3Cl)-O2 | (2-3) | 12% |
| 3-HHB(2F,3Cl)-O2 | (3-1-7) | 8% |
| 5-HHB(2F,3Cl)-O2 | (3-1-7) | 8% |
| 3-HBB(2F,3Cl)-O2 | (3-1-10) | 15% |
| 5-HBB(2F,3Cl)-O2 | (3-1-10) | 15% |
| 2-BB(F)B-3 | (4-4-1) | 10% |
| 2-BB(F)B-5 | (4-4-1) | 10% |

NI=97.3° C.; Tc≦−30° C.; Δn=0.144; Δε=−3.5.

Example 8

| | | |
|---|---|---|
| 3-Hdh-V | (1-1-1) | 10% |
| 3-Hdh-VFF | (1-1-1) | 8% |
| 3-HB(2F,3Cl)-O2 | (2-3) | 15% |
| 5-HB(2F,3Cl)-O2 | (2-3) | 14% |
| 3-HHB(2F,3Cl)-O2 | (3-1-7) | 5% |
| 4-HHB(2F,3Cl)-O2 | (3-1-7) | 5% |
| 5-HHB(2F,3Cl)-O2 | (3-1-7) | 5% |
| 3-HBB(2F,3Cl)-O2 | (3-1-10) | 10% |
| 5-HBB(2F,3Cl)-O2 | (3-1-10) | 10% |
| V2-HHB-1 | (4-2-2) | 4% |
| 3-HH-4 | (—) | 8% |
| V-HH-3 | (—) | 6% |

NI=70.1° C.; Tc≦−30° C.; Δn=0.085; Δε=−3.0; η=35.9 mPa·s; VHR-1=98.7%; VHR-2=98.2%; VHR-3=98.3%.

Example 9

| | | |
|---|---|---|
| 3-Hdh-V | (1-1-1) | 15% |
| 5-Hdh-1V | (1-1-1) | 5% |
| 3-HB(2F,3F)-O2 | (2-1) | 15% |
| 5-HB(2F,3F)-O2 | (2-1) | 15% |
| 3-HBB(2F,3F)-O2 | (3-1-4) | 15% |
| 5-HBB(2F,3F)-O2 | (3-1-4) | 15% |
| V-HH-3 | (—) | 3% |
| 1V-HH-3 | (—) | 10% |
| 5-HBB(F)B-2 | (—) | 4% |
| 5-HBB(F)B-3 | (—) | 3% |

NI=81.6° C.; Tc≦−40° C.; Δn=0.111; Δε=−3.4; η=21.1 mPa·s; Vth=2.29 V; VHR-1=98.8%; VHR-2=98.2%; VHR-3=98.2%.

Example 10

| | | |
|---|---|---|
| 3-Hdh-V | (1-1-1) | 15% |
| 5-Hdh-1V | (1-1-1) | 5% |
| 3-HB(2F,3F)-O2 | (2-1) | 15% |
| 5-HB(2F,3F)-O2 | (2-1) | 15% |
| 3-HBB(2F,3F)-O2 | (3-1-4) | 15% |
| 5-HBB(2F,3F)-O2 | (3-1-4) | 15% |
| V-HH-3 | (—) | 8% |
| VFF-HH-3 | (—) | 3% |
| 3-HHEBH-3 | (—) | 3% |
| 3-HHEBH-5 | (—) | 3% |
| 5-HB(F)BH-3 | (—) | 3% |

NI=82.2° C.; Tc≦−40° C.; Δn=0.101; Δε=−3.4; η=21.9 mPa·s; Vth=2.25 V.

Example 11

| | | |
|---|---|---|
| 3-Hdh-2 | (1-1-1) | 6% |
| 5-Hdh-2 | (1-1-1) | 10% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| V-HHB-1 | (4-2-2) | 5% |
| VFF-HHB-1 | (4-2-2) | 4% |
| 2-BB(F)B-3 | (4-4-1) | 5% |

NI=80.1° C.; Tc≦−30° C.; Δn=0.091; Δε=−3.7; η=24.5 mPa·s; Vth=2.18 V.

Example 12

| | | |
|---|---|---|
| 3-Hdh-2 | (1-1-1) | 10% |
| 5-Hdh-2 | (1-1-1) | 10% |
| 3-Hdh-O1 | (1-1-1) | 10% |
| 3-HB(2F,3F)-O2 | (2-1) | 14% |
| 5-HB(2F,3F)-O2 | (2-1) | 12% |
| 3-HHB(2F,3F)-O2 | (3-1-1) | 11% |
| 5-HHB(2F,3F)-O2 | (3-1-1) | 11% |
| 2-HHB(2F,3F)-1 | (3-1-1) | 11% |
| 3-HHB(2F,3F)-1 | (3-1-1) | 11% |

NI=70.0° C.; Tc≦−30° C.; Δn=0.072; Δε=−3.3; Vth=1.59 V; VHR-1=98.9%; VHR-2=98.2%; VHR-3=98.5%.

Example 13

| | | |
|---|---|---|
| 3-HVdh-3 | (1-1-3) | 14% |
| 3-HB(2F,3F)-O2 | (2-1) | 14% |
| 5-HB(2F,3F)-O2 | (2-1) | 14% |
| 3-HHB(2F,3F)-O2 | (3-1-1) | 11% |
| 5-HHB(2F,3F)-O2 | (3-1-1) | 11% |
| 2-HHB(2F,3F)-1 | (3-1-1) | 10% |
| 3-HHB(2F,3F)-1 | (3-1-1) | 10% |
| 2-BBB(2F)-5 | (4-4-2) | 4% |
| 5-BBB(2F)-2 | (4-4-2) | 4% |
| 2-BB(2F,5F)B-2 | (4-4-3) | 4% |
| 2-BB(2F,5F)B-3 | (4-4-3) | 4% |

NI=84.8° C.; Tc≦−30° C.; Δn=0.113; Δε=−3.6; η=30.2 mPa·s; Vth=2.20 V.

Example 14

| | | |
|---|---|---|
| V-dhH-3 | (1-2-1) | 20% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 3-HHEH-3 | (4-1-1) | 3% |
| 3-HHEH-5 | (4-1-1) | 3% |
| 3-HH1OH-3 | (4-1-2) | 4% |

NI=81.1° C.; Tc≦−30° C.; Δn=0.081; Δε=−3.8; η=24.9 mPa·s; Vth=2.00 V; VHR-1=99.0%; VHR-2=98.4%; VHR-3=98.7%.

Example 15

| | | |
|---|---|---|
| V-dhH-3 | (1-2-1) | 10% |
| V-dhH-5 | (1-2-1) | 10% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| V-HHB-1 | (4-2-2) | 5% |
| 2-BB(F)B-3 | (4-4-1) | 5% |

NI=74.9° C.; Tc≦−30° C.; Δn=0.091; Δε=−3.7; η=24.9 mPa·s; Vth=2.02 V.

Example 16

| 3-Bdh-2 | (1-1-4) | 10% |
| --- | --- | --- |
| 2O-Bdh-3 | (1-1-4) | 6% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| V-HHB-1 | (4-2-2) | 9% |
| 2-BB(F)B-3 | (4-4-1) | 5% |

NI=74.1° C.; Tc≦−30° C.; Δn=0.094; Δε=−3.6; η=26.0 mPa·s; Vth=1.99 V; VHR-1=99.0%; VHR-2=98.6%; VHR-3=98.7%.

Example 17

| 3-Bdh-2 | (1-1-4) | 5% |
| --- | --- | --- |
| 3-B2dh-2 | (1-1-5) | 5% |
| 3-HB(2F,3F)-O2 | (2-1) | 15% |
| 5-HB(2F,3F)-O2 | (2-1) | 13% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 3-HHB-3 | (4-2-1) | 3% |
| 3-HHB-O1 | (4-2-1) | 4% |
| 3-HH-EME | (—) | 5% |
| 3-HB-O2 | (—) | 5% |
| 5-HB-O2 | (—) | 5% |

NI=72.3° C.; Tc≦−30° C.; Δn=0.085; Δε=−3.5; VHR-1=99.0%; VHR-2=98.5%; VHR-3=98.5%.

Example 18

| 3-Bdh-2 | (1-1-4) | 5% |
| --- | --- | --- |
| 5-Bdh-2 | (1-1-4) | 5% |
| 3-dhB-2 | (1-2-4) | 10% |
| 3-HB(2F,3F)-O2 | (2-1) | 15% |
| 5-HB(2F,3F)-O2 | (2-1) | 10% |
| 3-HB(2F,3F)-O4 | (2-1) | 5% |
| 3-HBB(2F,3F)-O2 | (3-1-4) | 15% |
| 5-HBB(2F,3F)-O2 | (3-1-4) | 15% |
| 1V-HH-3 | (—) | 13% |
| 5-HBB(F)B-2 | (—) | 4% |
| 5-HBB(F)B-3 | (—) | 3% |

NI=72.8° C.; Tc≦−30° C.; Δn=0.105; Δε=−3.2; η=20.7 mPa·s; Vth=2.05 V; VHR-1=99.1%; VHR-2=98.6%; VHR-3=98.2%.

Example 19

| 3-Hdh-V | (1-1-1) | 10% |
| --- | --- | --- |
| 1V-Hdh-V | (1-1-1) | 20% |
| 3-HB(2F,3F)-O2 | (2-1) | 14% |
| 5-HB(2F,3F)-O2 | (2-1) | 12% |
| 3-HHB(2F,3F)-O2 | (3-1-1) | 11% |
| 5-HHB(2F,3F)-O2 | (3-1-1) | 11% |
| 2-HHB(2F,3F)-1 | (3-1-1) | 11% |
| 3-HHB(2F,3F)-1 | (3-1-1) | 5% |
| V-HHB-1 | (4-2-2) | 3% |
| 2-BB(F)B-3 | (4-4-1) | 3% |

NI=73.2° C.; Tc≦−30° C.; Δn=0.089; Δε=−3.1; η=29.0 mPa·s.

Example 20

| 3-H2dh-2 | (1-1-2) | 7% |
| --- | --- | --- |
| 3-dhH-O1 | (1-2-1) | 7% |
| 3-HB(2F,3F)-O2 | (2-1) | 14% |
| 5-HB(2F,3F)-O2 | (2-1) | 14% |
| 3-HHB(2F,3F)-O2 | (3-1-1) | 11% |
| 5-HHB(2F,3F)-O2 | (3-1-1) | 11% |
| 2-HHB(2F,3F)-1 | (3-1-1) | 10% |
| 3-HHB(2F,3F)-1 | (3-1-1) | 10% |
| 3-HBB-2 | (4-3-1) | 4% |
| 1V2-HBB-2 | (4-3-2) | 4% |
| 2-BB(F)B-3 | (4-4-1) | 8% |

NI=86.7° C.; Tc≦−30° C.; Δn=0.110; Δε=−3.6; η=31.0 mPa·s; Vth=2.22 V; VHR-1=98.9%; VHR-2=98.4%; VHR-3=98.3%.

Example 21

| 1V-Hdh-V | (1-1-1) | 8% |
| --- | --- | --- |
| V-dhH-3 | (1-2-1) | 10% |
| 3-HB(2F,3Cl)-O2 | (2-3) | 15% |
| 5-HB(2F,3Cl)-O2 | (2-3) | 7% |
| 3-HB(2Cl,3F)-O2 | (2-5) | 7% |
| 3-HHB(2F,3Cl)-O2 | (3-1-7) | 5% |
| 4-HHB(2F,3Cl)-O2 | (3-1-7) | 5% |
| 5-HHB(2F,3Cl)-O2 | (3-1-7) | 5% |
| 3-HBB(2F,3Cl)-O2 | (3-1-10) | 10% |
| 5-HBB(2F,3Cl)-O2 | (3-1-10) | 10% |
| V2-HHB-1 | (4-2-2) | 4% |
| 3-HH-4 | (—) | 8% |
| V-HH-3 | (—) | 6% |

NI=70.9° C.; Tc≦−30° C.; Δn=0.087; Δε=−3.0; η=35.9 mPa·s; Vth=2.07 V; VHR-1=98.7%; VHR-2=98.4%; VHR-3=98.4%.

Example 22

| 3-Hdh-V | (1-1-1) | 16% |
| --- | --- | --- |
| 3-H2B(2F,3F)-O2 | (2-2) | 15% |
| 5-H2B(2F,3F)-O2 | (2-2) | 15% |
| 2-HHB(2F,3F)-1 | (3-1-1) | 9% |
| 3-HHB(2F,3F)-1 | (3-1-1) | 8% |
| 3-HBB(2F,3F)-O2 | (3-1-4) | 10% |
| 5-HBB(2F,3F)-O2 | (3-1-4) | 10% |
| V-HHB-1 | (4-2-2) | 9% |
| 2-BB(F)B-3 | (4-4-1) | 5% |
| 5-HBB(F)B-2 | (—) | 3% |

NI=84.7° C.; Tc≦−40° C.; Δn=0.097; Δε=−3.8; η=22.0 mPa·s; Vth=2.10 V; VHR-1=99.3%; VHR-2=98.6%; VHR-3=98.7%.

Example 23

| | | |
|---|---|---|
| 3-Hdh-V | (1-1-1) | 10% |
| 3-Hdh-1V | (1-1-1) | 4% |
| 3-HB(2F,3F)-O2 | (2-1) | 4% |
| 5-HB(2F,3F)-O2 | (2-1) | 4% |
| 3-H2B(2F,3F)-O2 | (2-2) | 10% |
| 5-H2B(2F,3F)-O2 | (2-2) | 10% |
| 2-HHB(2F,3F)-1 | (3-1-1) | 5% |
| 3-HHB(2F,3F)-1 | (3-1-1) | 5% |
| 3-HH2B(2F,3F)-O2 | (3-1-2) | 11% |
| 5-HH2B(2F,3F)-O2 | (3-1-2) | 11% |
| 3-HBB(2F,3F)-O2 | (3-1-4) | 5% |
| 5-HBB(2F,3F)-O2 | (3-1-4) | 5% |
| 2-BB(F)B-3 | (4-4-1) | 8% |
| 2-BB(F)B-5 | (4-4-1) | 8% |

NI=89.7° C.; Tc≦−30° C.; Δn=0.122; Δε=−3.7; η=31.6 mPa·s; Vth=2.15 V; VHR-1=99.0%; VHR-2=98.3%; VHR-3=98.4%.

Example 24

| | | |
|---|---|---|
| 3-Hdh-V | (1-1-1) | 15% |
| 5-Hdh-1V | (1-1-1) | 5% |
| 3-HB(2F,3F)-O2 | (2-1) | 15% |
| 5-HB(2F,3F)-O2 | (2-1) | 10% |
| 3-HB(2F,3F)-O4 | (2-1) | 5% |
| 3-HBB(2F,3F)-O2 | (3-1-4) | 15% |
| 5-HBB(2F,3F)-O2 | (3-1-4) | 15% |
| 3-HH-O1 | (—) | 5% |
| V-HH-V1 | (—) | 5% |
| 7-HB-1 | (—) | 3% |
| 3-HEB-O2 | (—) | 3% |
| 1O1-HBBH-3 | (—) | 4% |

NI=70.4° C.; Tc≦−40° C.; Δn=0.104; Δε=−3.3; η=20.2 mPa·s; Vth=2.02 V; VHR-1=98.9%; VHR-2=98.5%; VHR-3=98.5%.

Example 25

| | | |
|---|---|---|
| 3-Hdh-V | (1-1-1) | 10% |
| 3-HB(2F,3F)-O2 | (2-1) | 10% |
| 5-HB(2F,3F)-O2 | (2-1) | 10% |
| 3-HB(2F,3F)-O4 | (2-1) | 10% |
| 3-HBB(2F,3F)-O2 | (3-1-4) | 19% |
| 5-HBB(2F,3F)-O2 | (3-1-4) | 19% |
| 2-BB(F)B-3 | (4-4-1) | 8% |
| 5-HBB(F)B-2 | (—) | 7% |
| 5-HBB(F)B-3 | (—) | 7% |

NI=106.8° C.; Tc≦−30° C.; Δn=0.153; Δε=−3.8.

Example 26

| | | |
|---|---|---|
| 3-Hdh-V | (1-1-1) | 8% |
| 3-BdhH-3 | (1-5-1) | 5% |
| 3-HdhB-3 | (1-6-1) | 5% |
| 3-HB(2F,3F)-O2 | (2-1) | 10% |
| 5-HB(2F,3F)-O2 | (2-1) | 10% |
| 2-HHB(2F,3F)-1 | (3-1-1) | 4% |
| 3-HHB(2F,3F)-2 | (3-1-1) | 4% |
| 3-HHB(2F,3F)-O2 | (3-1-1) | 12% |
| 5-HHB(2F,3F)-O2 | (3-1-1) | 10% |
| 3-HHEH-3 | (4-1-1) | 4% |
| 3-HHEH-5 | (4-1-1) | 3% |
| 4-HHEH-3 | (4-1-1) | 3% |
| 3-HH-4 | (—) | 5% |
| 3-HH-5 | (—) | 5% |
| 3-HH-O1 | (—) | 6% |
| 3-HH-O3 | (—) | 6% |

NI=86.0° C.; Tc≦−20° C.; Δn=0.077; η=27.2 mPa·s; Δε=−3.5.

Example 27

| | | |
|---|---|---|
| 3-Hdh-V | (1-1-1) | 16% |
| 3-BHdh-V | (1-3-1) | 4% |
| V-dhHB-3 | (1-4-1) | 5% |
| 3-HB(2F,3F)-O2 | (2-1) | 15% |
| 5-HB(2F,3F)-O2 | (2-1) | 15% |
| 3-HHB(2F,3F)-O2 | (3-1-1) | 10% |
| 5-HHB(2F,3F)-O2 | (3-1-1) | 10% |
| 2-HHB(2F,3F)-1 | (3-1-1) | 10% |
| 3-HHB(2F,3F)-1 | (3-1-1) | 10% |
| 2-BB(F)B-3 | (4-4-1) | 5% |

NI=80.2° C.; Tc≦−30° C.; Δn=0.094; Δε=−3.8; η=26.6 mPa·s; Vth=2.05 V; VHR-1=99.0%.

Example 28

| | | |
|---|---|---|
| 3-Hdh-V | (1-1-1) | 10% |
| 3-Hdh-1V | (1-1-1) | 4% |
| 3-BBdh-2V1 | (1-3-5) | 4% |
| 1V2-dhBB-3 | (1-4-5) | 4% |
| 3-HB(2F,3F)-O2 | (2-1) | 4% |
| 5-HB(2F,3F)-O2 | (2-1) | 4% |
| 3-H2B(2F,3F)-O2 | (2-2) | 10% |
| 5-H2B(2F,3F)-O2 | (2-2) | 10% |
| 2-HHB(2F,3F)-1 | (3-1-1) | 5% |
| 3-HHB(2F,3F)-1 | (3-1-1) | 5% |
| 3-HH2B(2F,3F)-O2 | (3-1-2) | 11% |
| 5-HH2B(2F,3F)-O2 | (3-1-2) | 11% |
| 3-HBB(2F,3F)-O2 | (3-1-4) | 5% |
| 5-HBB(2F,3F)-O2 | (3-1-4) | 5% |
| 2-BB(F)B-3 | (4-4-1) | 8% |

NI=92.5° C.; Tc≦−30° C.; Δn=0.116; Δε=−3.7; η=31.3 mPa·s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a negative dielectric anisotropy comprising three components, wherein the first component is at least one compound selected from the group of compounds represented by Formulas (1-1) to (1-6), the second component is at least one compound selected from the group of compounds represented by Formula (2), and the third component is at least one compound selected from the group of compounds represented by Formulas (3-1) and (3-2):

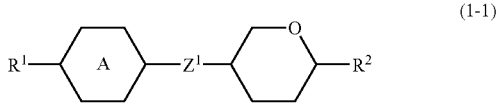
(1-1)

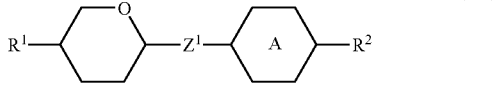
(1-2)

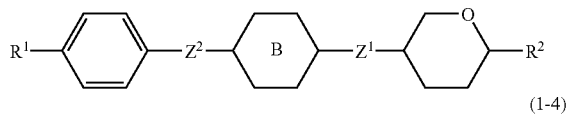
(1-3)

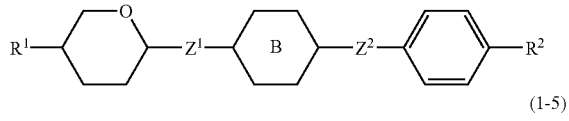
(1-4)

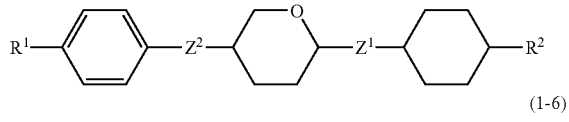
(1-5)

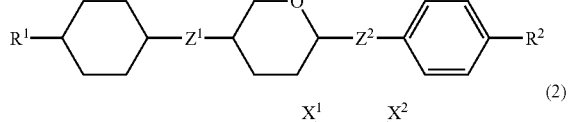
(1-6)

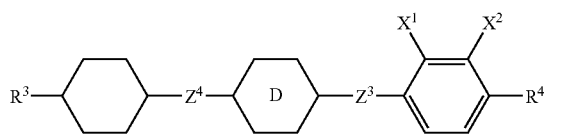
(2)

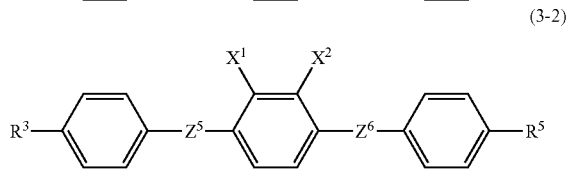
(3-1)
(3-2)

wherein $R^1$ and $R^2$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $X^1$ and $X^2$ are each independently fluorine or chlorine, provided that at least one of $X^1$ and $X^2$ is fluorine; $Z^1$ and $Z^2$ are each independently a single bond, —CH$_2$CH$_2$— or —CH=CH—; $Z^3$ to $Z^6$ are each independently a single bond or —CH$_2$CH$_2$—; and ring A, ring B, ring C and ring D are each independently 1,4-cyclohexylene or 1,4-phenylene.

2. The Liquid crystal composition according to claim 1, wherein the first component is at least one compound selected from the group of compounds represented by Formulas (1-1) and (1-2), and the third component is at least one compound selected from the group of compounds represented by Formula (3-1).

3. The Liquid crystal composition according to claim 1, wherein the first component is at least one compound selected from the group of compounds represented by Formulas (1-3) to (1-6), and the third component is at least one compound selected from the group of compounds represented by Formula (3-1).

4. The Liquid crystal composition according to claim 1, wherein the ratio of the first component is from approximately 10% by weight to approximately 40% by weight, the ratio of the second component is from approximately 15% by weight to approximately 40% by weight, and the ratio of the third component is from approximately 20% by weight to approximately 50% by weight, based on the total weight of the liquid crystal composition.

5. A liquid crystal composition having a negative dielectric anisotropy comprising three components, wherein the first component is at least one compound selected from the group of compounds represented by Formulas (1-1-A) to (1-6-A), the second component is at least one compound selected from the group of compounds represented by Formula (2-A), and the third component is at least one compound selected from the group of compounds represented by Formulas (3-1-A) and (3-2-A):

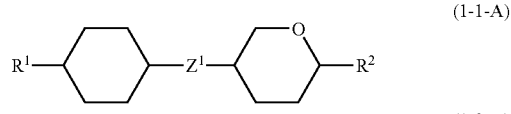
(1-1-A)

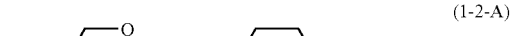
(1-2-A)

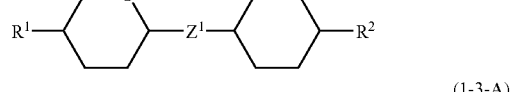
(1-3-A)

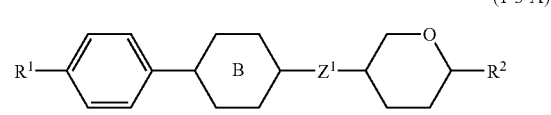
(1-4-A)

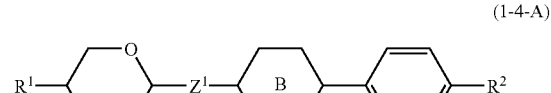
(1-5-A)

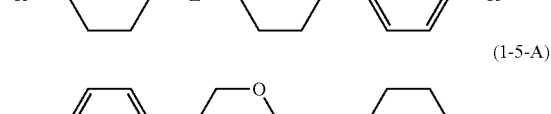
(1-6-A)

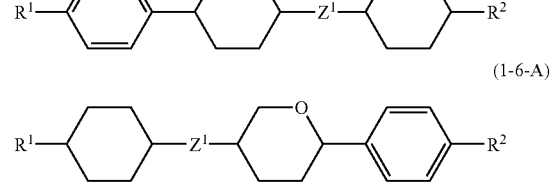

-continued

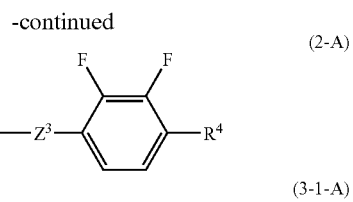
(2-A)

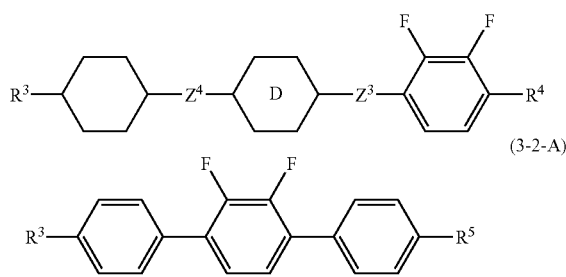
(3-1-A)

(3-2-A)

wherein $R^1$ and $R^2$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $R^3$ to $R^5$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $Z^1$ is a single bond, —$CH_2CH_2$— or —CH═CH—; $Z^3$ and $Z^4$ are each independently a single bond or —$CH_2CH_2$—; and ring B and ring D are each independently 1,4-cyclohexylene or 1,4-phenylene.

6. The liquid crystal composition according to claim 5, wherein the second component is at least one compound selected from the group of compounds represented by formula (2-A); in Formula (2-A), $R^3$ is alkyl having 1 to 12 carbons or alkenyl having 2 to 12 carbons, and $R^4$ is alkoxy having 1 to 12 carbons; in Formula (3-1-A), $R^3$ is alkyl having 1 to 12 carbons or alkenyl having 2 to 12 carbons, $R^4$ is alkoxy having 1 to 2 carbons; and in Formula (3-2-A), $R^3$ and $R^5$ are each independently alkyl having 1 to 12 carbons.

7. The liquid crystal composition according to claim 6, wherein in Formulas (1-1-A) to (1-6-A), $Z^1$ is a single bond, one of $R^1$ and $R^2$ is alkyl having 1 to 12 carbons, and the other is alkenyl having 2 to 12 carbons.

8. The liquid crystal composition according to claim 7, wherein the first component is at least one compound selected from the group of compounds represented by Formulas (1-1-A) and (1-2-A), and the third component is at least one compound selected from the group of compounds represented by Formula (3-1-A).

9. The Liquid crystal composition according to claim 7, wherein the first component is at least one compound selected from the group of compounds represented by Formulas (1-3-A) to (1-6-A), and the third component is at least one compound selected from the group of compounds represented by Formula (3-1-A).

10. The liquid crystal composition according to claim 7, wherein the first component is a mixture of at least one compound selected from the group of compounds represented by Formulas (1-1-A) and (1-2-A) and at least one compound selected from the group of compounds represented by Formulas (1-3-A) to (1-6-A), and the third component is at least one compound selected from the group of compounds represented by Formula (3-1-A).

11. The liquid crystal composition according to claim 5, wherein the ratio of the first component is from approximately 10% by weight to approximately 40% by weight, the ratio of the second component is from approximately 15% by weight to approximately 40% by weight, and the ratio of the third component is from approximately 20% by weight to approximately 50% by weight, based on the total weight of the liquid crystal composition.

12. The liquid crystal composition according to claims 5, wherein the composition further comprises at least one compound selected from the group of compounds represented by Formulas (4-1-A) to (4-4-A) as a fourth component:

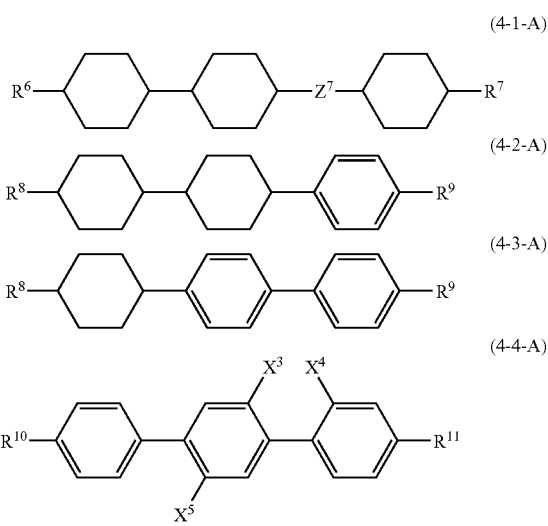

wherein $R^6$ to $R^{11}$ are each independently alkyl having 1 to 12 carbons, alkoxy having from 1 to 12 carbons, alkenyl having 2 to 12 carbons or alkenyl having 2 to 12 carbons, arbitrary hydrogen of which are replaced by fluorine; $X^3$, $X^4$ and $X^5$ are each independently fluorine or hydrogen, provided that at least one of $X^3$, $X^4$ and $X^5$ is fluorine; and $Z^7$ is —COO— or —$CH_2O$—.

13. The liquid crystal composition according to claim 12, wherein in Formula (4-1-A), $R^6$ and $R^7$ are alkyl having 1 to 12 carbons, and $Z^7$ is —COO—; in Formulas (4-2-A) and (4-3-A), $R^8$ is alkenyl having 2 to 12 carbons, and $R^9$ is alkyl having 1 to 12 carbons; and in Formula (4-4-A), $R^{10}$ and $R^{11}$ are each independently alkyl having 1 to 12 carbons or alkenyl having 2 to 12 carbons, $X^3$ is fluorine, and $X^4$ and $X^5$ are hydrogen.

14. The liquid crystal composition according to claim 12, wherein the fourth component is at least one compound selected from the group of compounds represented by Formula (4-2-A).

15. The liquid crystal composition according to claim 12, wherein the fourth component is at least one compound selected from the group of compounds represented by Formula (4-4-A).

16. The liquid crystal composition according to claims 12, wherein the ratio of the first component is from approximately 10% by weight to approximately 40% by weight, the ratio of the second component is from approximately 15% by weight to approximately 40% by weight, the ratio of the third component is from approximately 20% by weight to approximately 50% by weight, and the ratio of the fourth component is from approximately 5% by weight to approximately 30% by weight, based on the total weight of the liquid crystal composition.

17. The liquid crystal composition according to claim 1, wherein the composition has a maximum temperature of a nematic phase of approximately 70° C. or more, a dielectric anisotropy (25° C.) at a frequency of 1 kHz of from approximately −6.0 to approximately −3.0, and a refractive index anisotropy (25° C.) at a wavelength of 589 nm of from approximately 0.08 to approximately 0.13.

18. A liquid display device that includes the liquid crystal composition according to claim 1.

19. The liquid crystal display device according to claim 18, wherein the liquid crystal display device has an operation mode of a VA mode or an IPS mode, and has a driving mode of an active matrix mode.

\* \* \* \* \*